(12) United States Patent
Cote et al.

(10) Patent No.: US 7,025,885 B2
(45) Date of Patent: *Apr. 11, 2006

(54) WATER FILTRATION USING IMMERSED MEMBRANES

(75) Inventors: Pierre Cote, Dundas (CA); Arnold Janson, Burlington (CA); Hadi Husain, Brampton (CA); Manwinder Singh, Burlington (CA); Nicholas Adams, Hamilton (CA)

(73) Assignee: ZENON Environmental Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/006,626

(22) Filed: Dec. 8, 2004

(65) Prior Publication Data

US 2005/0082227 A1    Apr. 21, 2005

Related U.S. Application Data

(60) Continuation of application No. 10/098,365, filed on Mar. 18, 2002, now Pat. No. 6,899,812, which is a division of application No. 09/444,414, filed on Nov. 22, 1999, now Pat. No. 6,375,848.

(60) Provisional application No. 60/109,520, filed on Nov. 23, 1998.

(51) Int. Cl.
*B01D 61/00* (2006.01)

(52) U.S. Cl. ............... 210/650; 210/636; 210/321.69; 210/321.8

(58) Field of Classification Search ........... 210/636, 210/650, 321.69, 321.8, 321.79, 220, 333.1, 210/333.01
See application file for complete search history.

(56) References Cited

U.S. PATENT DOCUMENTS

| | | | |
|---|---|---|---|
| 3,794,169 A | 2/1974 | Sisk et al. |
| 3,853,756 A | 12/1974 | Stana |
| 3,992,301 A | 11/1976 | Shippey et al. |
| 4,096,060 A | 6/1978 | Lee et al. |
| 4,414,113 A | 11/1983 | LaTerra |
| 4,668,401 A | 5/1987 | Okumura et al. |
| 4,720,342 A | 1/1988 | Takemura et al. |
| 4,781,832 A | 11/1988 | Takemura et al. |
| 4,904,395 A | 2/1990 | Henricson |
| 5,035,799 A | 7/1991 | Rosberg et al. |
| 5,066,402 A | 11/1991 | Anselme et al. |
| 5,122,287 A | 6/1992 | Hsiung |
| 5,132,015 A | 7/1992 | Down |
| 5,176,725 A | 1/1993 | Puri et al. |
| 5,248,424 A | 9/1993 | Cote et al. |

(Continued)

FOREIGN PATENT DOCUMENTS

DE           19502516           1/1997

(Continued)

OTHER PUBLICATIONS

Toshio et al, JP 3-68426 (Kokai unexamined patent application), 3/25/991.*

*Primary Examiner*—Ana M. Fortuna
(74) *Attorney, Agent, or Firm*—Bereskin & Parr

(57) ABSTRACT

A process for operating filtering membranes submerged in a tank involves, in one aspect, periodically deconcentrating the tank by partially emptying and refilling the tank with fresh water. The emptying and refilling may be performed generally simultaneously or sequentially. In another embodiment, the membrane modules are arranged in a series of filtration zones between a feed water inlet and a retentate outlet of a tank and the zone adjacent the outlet is emptied and refilled.

8 Claims, 17 Drawing Sheets

U.S. PATENT DOCUMENTS

| | | |
|---|---|---|
| 5,288,308 A | 2/1994 | Puri et al. |
| 5,403,479 A | 4/1995 | Smith et al. |
| 5,451,317 A | 9/1995 | Ishida et al. |
| 5,607,593 A * | 3/1997 | Cote et al. ................. 210/650 |
| 5,643,455 A | 7/1997 | Kopp et al. |
| 5,647,988 A | 7/1997 | Kawanishi et al. |
| 5,783,083 A | 7/1998 | Henshaw et al. |
| 5,958,243 A | 9/1999 | Lawrence et al. |
| 5,997,743 A | 12/1999 | Ahn et al. |
| 6,027,649 A | 2/2000 | Benedek et al. |
| 6,045,698 A | 4/2000 | Cote et al. |
| 6,245,239 B1 | 6/2001 | Cote et al. |
| 6,280,626 B1 | 8/2001 | Miyashita et al. |
| 6,325,938 B1 | 12/2001 | Miyashita et al. |
| 6,331,251 B1 | 12/2001 | Del Vecchio et al. |
| RE37,549 E | 2/2002 | Mahendran et al. |
| 6,375,848 B1 | 4/2002 | Cote et al. |
| 6,511,602 B1 | 1/2003 | Miyashita et al. |
| 6,547,968 B1 | 4/2003 | Rabie et al. |
| 6,616,843 B1 | 9/2003 | Behmann et al. |
| 6,682,652 B1 * | 1/2004 | Mahendran et al. ..... 210/195.2 |
| 6,893,568 B1 * | 5/2005 | Janson et al. ............. 210/650 |
| 6,899,812 B1 * | 5/2005 | Cote et al. ................. 210/636 |

FOREIGN PATENT DOCUMENTS

| | | |
|---|---|---|
| EP | 0427376 | 5/1991 |
| EP | 0 655 418 A1 | 5/1995 |
| EP | 0 678 326 A1 | 10/1995 |
| GB | 2120952 A | 12/1983 |
| JP | 61-192309 | 8/1985 |
| JP | 61-157306 | 7/1986 |
| JP | 61-197005 | 9/1986 |
| JP | 61-263605 | 11/1986 |
| JP | 63291605 | 11/1988 |
| JP | 1067207 | 3/1989 |
| JP | 01-293103 | 11/1989 |
| JP | 03-000114 | 1/1991 |
| JP | 04-126528 | 4/1992 |
| JP | 04-131182 | 5/1992 |
| JP | 4215887 | 8/1992 |
| JP | 05-154362 | 6/1993 |
| JP | 05-154476 | 6/1993 |
| JP | 05-184884 | 7/1993 |
| JP | 06-023245 | 2/1994 |
| JP | 06-218237 | 8/1994 |
| JP | 06-277664 | 10/1994 |
| JP | 07-047245 | 2/1995 |
| JP | 07-116482 | 5/1995 |
| JP | 07-132213 | 5/1995 |
| JP | 07-227526 | 8/1995 |
| JP | 08-131785 | 5/1996 |
| JP | 08-206472 | 8/1996 |
| JP | 08-252438 | 10/1996 |
| JP | 08-257372 | 10/1996 |
| JP | 08-281082 | 10/1996 |
| JP | 8257373 | 10/1996 |
| JP | 09-138298 | 5/1997 |
| JP | 09-220569 | 8/1997 |
| JP | 09-248432 | 9/1997 |
| JP | 09-290261 | 11/1997 |
| JP | 09-308882 | 12/1997 |
| JP | 10-277599 | 10/1998 |
| JP | 10286563 | 10/1998 |
| WO | WO90/11120 | 10/1990 |
| WO | WO 97/06880 | 2/1997 |
| WO | WO 97/18887 | 5/1997 |
| WO | WO 98/28068 | 7/1998 |

* cited by examiner

WATER FILTRATION USING IMMERSED MEMBRANES

This is a continuation of U.S. patent application Ser. No. 10/098,365, filed Mar. 18, 2002 now U.S. Pat. No. 6,899,812; which is a division of U.S. patent application Ser. No. 09/444,414, filed Nov. 22, 1999 now U.S. Pat. No. 6,375,848; which is an application claiming the benefit under 35 USC 119(e) of U.S. provisional patent application No. 60/109,520, filed Nov. 23, 1998. U.S. application Ser. Nos. 10/098,365, 09/444,414 and 60/109,520 are incorporated herein, in their entirety, by this reference to them.

FIELD OF THE INVENTION

This invention relates to the use of ultrafiltration or microfiltration membranes to treat water, and more particularly to the design and operation of reactors which use immersed membranes as part of a substantially continuous process for filtering water containing low concentrations of solids, for example for producing potable water.

BACKGROUND OF THE INVENTION

Immersed membranes are used for separating a permeate lean in solids from tank water rich in solids. Feed water flowing into a tank containing immersed membranes has an initial concentration of solids. Filtered permeate passes through the walls of the membranes under the influence of a transmembrane pressure differential between a retentate side of the membranes and a permeate side of the membranes. As filtered water is permeated through the membranes and removed from the system, the solids are rejected and accumulate in the tank. These solids must be removed from the tank in order to prevent rapid fouling of the membranes which occurs when the membranes are operated in water containing a high concentration of solids.

In a continuous fully mixed process, there is typically a continuous bleed of tank water rich in solids, which may be called retentate. Unfortunately, while this process preserves a mass balance, the tank water must contain a high concentration of pollutants or the process will generate large volumes of retentate.

For example, if a fully mixed continuous bleed process is operated at a recovery rate of 95% (ie. 95% of the feed water becomes filtered permeate), only 5% of the feed water leaves the tank as retentate. To preserve a mass balance of solids, the retentate must have a concentration of pollutants 20 times that of the feed water. The concentration of solids in the retentate, however, is the same as the concentration of solids in the tank since the retentate is drawn from the tank water. Accordingly, the tank water has a high concentration of pollutants at all times. Operating at a lower recovery rate, 80% for example, results in tank water having a lower concentration of solids but the cost of transporting excess feedwater and then disposing of excess retentate also increases.

Another process involves filtering in a batch mode. For example, PCT Publication No. WO 98/28066 describes a process in which retentate is not withdrawn continuously. Instead, the tank water is drained to remove the accumulated solids from time to time. The tank is then refilled with fresh feed water and operation continues. While regular operation is interrupted in this method, there is a period directly after the tank is refilled in which the membranes are operated in relatively solids lean tank water. For feed water with low suspended solids, the intervals between drainings may be long enough that the benefit gained by emptying the tank offsets the loss in production time.

With either process, as filtered water is permeated through the membranes the solids in the tank water foul the membranes. The rate of fouling is related to the concentration of solids in the tank water and can be reduced but not eliminated in a fully mixed continuous bleed process by lowering the recovery rate. Further, the solids may be present in the feed water in a variety of forms which contribute to fouling in different ways. To counter the different types of fouling, many different types of cleaning regimens may be required. Such cleaning usually includes both physical cleaning and chemical cleaning.

The most frequently used methods of physical cleaning are backwashing and aeration. These methods are typically performed frequently and thus may influence the filtering process. In backwashing, permeation through the membranes is stopped momentarily. Air or water flow through the membranes in a reverse direction to physically push solids off of the membranes. In aeration, bubbles are produced in the tank water below the membranes. As the bubbles rise, they agitate or scrub the membranes and thereby remove some solids while creating an air lift effect and circulation of the tank water to carry the solids away from the membranes. These two methods may also be combined. For example, in a fully mixed continuous bleed process as described above, aeration may be provided continuously and the membranes backwashed periodically while permeation is temporarily stopped. Alternately, PCT Publication No. WO 98/28066 mentioned above describes a process in which permeation continues for 15 minutes and then stops while the membranes are aerated for 2 minutes and 15 seconds. After the first minute of aeration, the membranes are backwashed for 15 seconds.

Chemical cleaning is typically performed less frequently than backwashing or aeration. According to one class of methods, permeation is stopped and a chemical cleaner is backwashed through the membranes. In some cases, the tank is emptied during or after the cleaning event so that the chemical cleaner can be collected and disposed of. In other cases, the tank remains filled and the amount of chemical cleaner in a cleaning event is limited to an amount that is tolerable for the application.

Known fully mixed continuous bleed processes rely heavily on aeration, backwashing and chemical cleaning to maintain membrane permeability. The cleaning methods all damage the membranes over time. In addition, backwashing with permeate or chemical cleaner interrupts permeation and reduces the yield of the process. Aeration requires energy which add to the operating costs of a reactor and the resulting circulation of tank water requires significant open space in the tank. Processes that involve frequently draining the tank require less cleaning in some cases. Particularly in large systems, however, loss in production time can be high because it is difficult to drain a large municipal or industrial tank quickly. In some cases, the tank is raised and fitted with a large number of drains to promote rapid draining but these techniques increase the cost of an installation.

SUMMARY OF THE INVENTION

It is an object of the present invention to provide a process and apparatus which uses immersed filtering membranes as part of a substantially continuous process for filtering water containing low concentrations of solids, for example to produce potable water.

In one aspect, the invention provides an improvement to a process for filtering water using membranes immersed in an open tank. The improvement includes reducing the concentration of solids in the water in the tank from time to time through deconcentrations. The deconcentrations are performed by withdrawing retentate rich in solids and simultaneously replacing it with a similar volume of feed water such that the membranes remain immersed during the deconcentration and permeation is not interrupted. The volume of retentate removed in a deconcentration is between 40% and 300% of the volume of water normally in the tank. At the end of a deconcentration, the water in the tank has 40% or less of the average concentration of solids in the tank before the deconcentration. Preferably, one or more of aeration or backwashing are biased towards a later part of a period between deconcentrations.

In another aspect, the invention provides an immersed membrane filter. One or more membrane modules are placed in an open tank spaced consecutively along a general flow path between an inlet and an outlet. The distance between membrane modules (measured along the flow path) is less than one half of the length of each membrane module (measured along the flow path). The total length of all of the membrane modules (measured along the flow path) excluding the distance between them (along the flow path) is at least twice the width of the membrane modules (measured perpendicular to the flow path). A similar flux of permeate is collected from the various membrane modules. Agitators, preferably aerators, are provided below the membrane modules and operated substantially throughout permeation to entrain tank water around the membrane modules and flow the water containing solids upwards through the modules. Tank water flows through a plurality of membrane modules sequentially in relation to the flow path before leaving the tank at the outlet. Preferably, one or more of aeration, backwashing and packing density are biased towards the outlet end of the tank. The tank may be deconcentrated from time to time as described above.

In another aspect, the invention provides an open tank divided into a plurality of sequential filtration zones. Partitions between the filtration zones substantially prevent mixing between the filtration zones but for permitting water containing solids to flow from the first filtration zone to the last filtration zone through the filtration zones in sequence. One or more membrane modules are placed in each filtration zone and a similar permeate flux is withdrawn from each filtration zone. A non-porous casing around the one or more membrane modules in each filtration zone provides a vertical flow channel through the one or more membrane modules. Tank water flows downwards through the one or more membrane modules in each filtration zone. A plurality of passages connect the bottom of the vertical flow channel in one filtration zone to the top of the vertical flow channel of another filtration zone and permit the tank water to flow from the first filtration zone to the last filtration zone through the filtration zones consecutively. The passages include a weir at the tops of the partitions. Preferably, packing density, aeration and backwashing are biased towards an outlet end of the tank. The tank may be deconcentrated from time to time as described above. Alternatively, the last filtration zone may be deconcentrated by draining and refilling it while permeation from the last filtration zone is stopped.

BRIEF DESCRIPTION OF THE DRAWINGS

Preferred embodiments of the invention will now be described below with reference to the following figures.

DETAILED DESCRIPTION OF THE INVENTION

General Filtration Process

The following description of a filtration process applies generally to the embodiments which are described further below unless inconsistent with the description of any particular embodiment.

Figure 1:
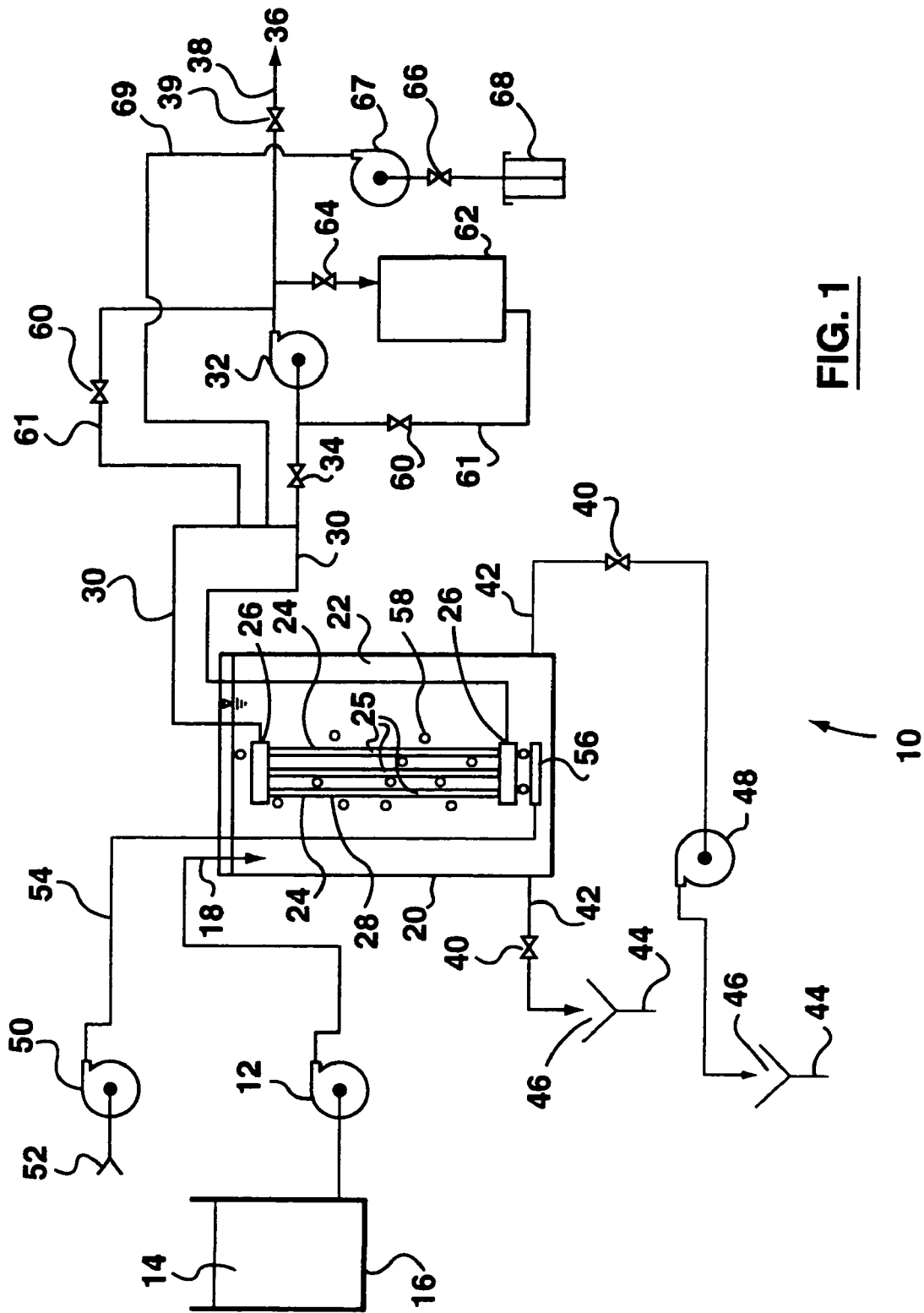
FIG. 1 is a schematic representation of a general immersed membrane reactor.

Referring now to FIG. 1, a first reactor 10 is shown for treating a liquid feed having solids to produce a filtered permeate substantially free of solids and a consolidated retentate rich in solids. Such a reactor 10 has many potential applications such as separating clean water from mixed liquor in a wastewater treatment plant or concentrating fruit juices etc., but will be described below as used for creating potable water from a natural supply of water such as a lake, well, or reservoir. Such a water supply typically contains colloids, suspended solids, bacteria and other particles which must be filtered out and will be collectively referred to as solids.

The first reactor 10 includes a feed pump 12 which pumps feed water 14 to be treated from a water supply 16 through an inlet 18 to a tank 20 where it becomes tank water 22. Alternatively, a gravity feed may be used with feed pump 12 replaced by a feed valve. During permeation, the tank water 22 is maintained at a level which covers a plurality of membranes 24. Each membrane 24 has a permeate side which does not contact the tank water 22 and a retentate side which does contact the tank water 22. Preferably, the membranes 24 are hollow fibre membranes for which the outer surface of the membranes 24 is preferably the retentate side and the lumens 25 of the membranes 24 are preferably the permeate side.

Each membrane 24 is attached to at least one but preferably two headers 26 such that the ends of the membranes 24 are surrounded by potting resin to produce a watertight connection between the outside of the membranes 24 and the headers 26 while keeping the lumens 25 of the membranes 24 in fluid communication with a permeate channel in at least one header 26. Membranes 24 and headers 26 together form of a membrane module 28. The permeate channels of the headers 26 are connected to a permeate collector 30 and a permeate pump 32 through a permeate valve 34. When permeate pump 32 is operated and permeate valve 34 opened, a negative pressure is created in the lumens 25 of the membranes 24 relative to the tank water 22 surrounding the membranes 24. The resulting transmembrane pressure is typically between 1 kPa and 150 kPa and more typically between 10 kPa and 70 kPa and draws tank water 22 (then referred to as permeate 36) through membranes 24 while the membranes 24 reject solids which remain in the tank water 22. Thus, filtered permeate 36 is produced for use at a permeate outlet 38 through an outlet valve 39. Periodically, a storage tank valve 64 is opened to admit permeate 36 to a storage tank 62. The filtered permeate 36 may require post treatment before being used as drinking water, but should have acceptable levels of colloids and other suspended solids.

Figure 2:
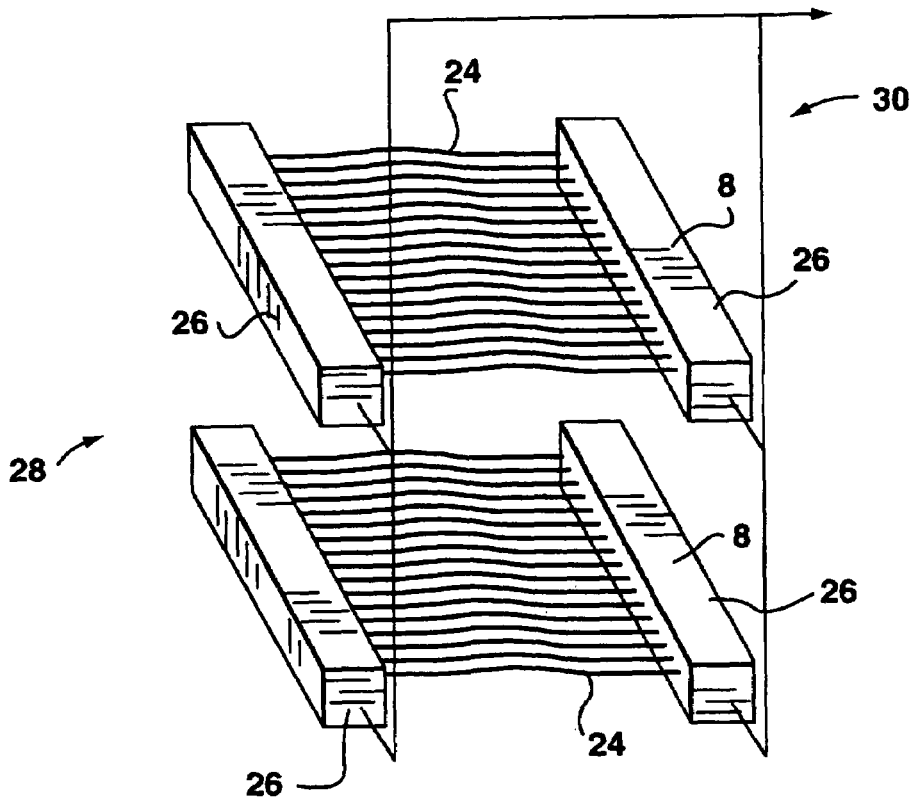
FIGS. 2, 3 and 4 are representations of various membrane modules.
Figure 3:
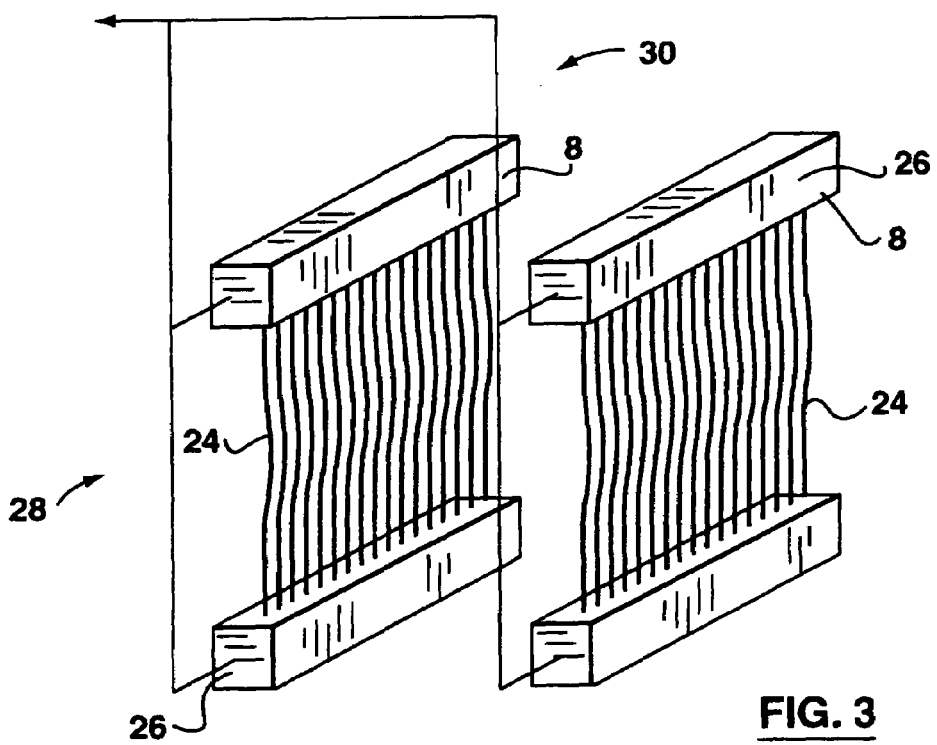
Figure 4:
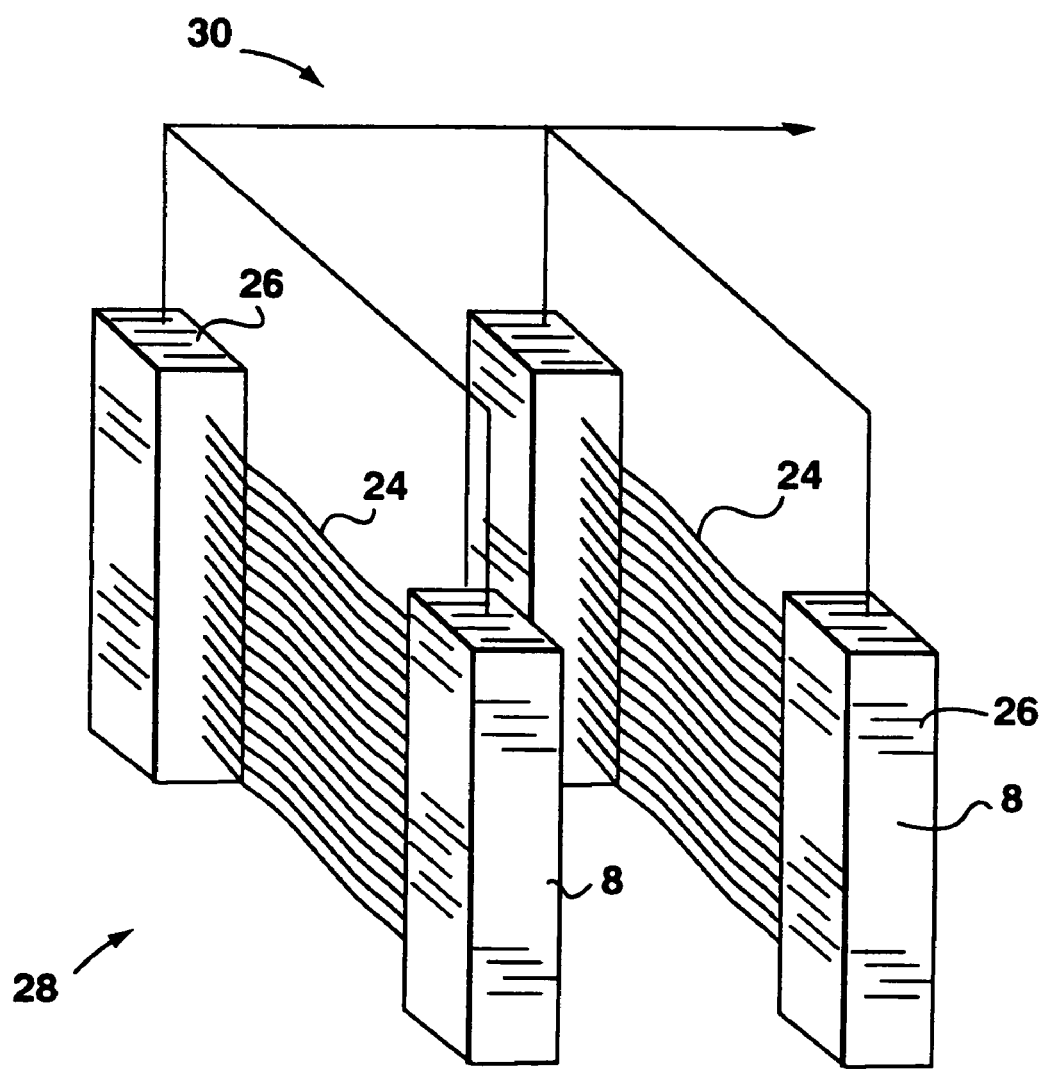

In a municipal or industrial reactor 10, discrete units each having a plurality of membranes 24 are assembled together into larger units called membrane modules 28 which may also be referred to as a cassette. Examples of such membrane modules 28 are shown in FIGS. 2, 3 and 4 in which the discrete units are rectangular skeins 8. Each rectangular skein 8 typically has a bunch between 2 cm and 10 cm wide of hollow fibre membranes 24. The hollow fibre membranes 24 typically have an outside diameter between 0.4 mm and 4.0 mm and are potted at a packing density between 10% and 40%. The hollow fibre membranes 24 are typically between 400 mm and 1,800 mm long and mounted with between 0.1% and 5% slack. The membranes 24 have an average pore size in the microfiltration or ultrafiltration range, preferably between 0.003 microns and 10 microns and more preferably between 0.02 microns and 1 micron. The preferred number of membrane modules 28 varies for different applications depending on factors such as the amount of filtered permeate 36 required and the condition of the feed water 14.

Referring to FIG. 2, for example, a plurality of rectangular skeins 8 are connected to a common permeate collector 30. Depending on the length of the membranes 24 and the depth of the tank 20, the membrane modules 28 shown in FIG. 2 may also be stacked one above the other. Referring to FIGS. 3 and 4, the rectangular skeins 8 are shown in alternate orientations. In FIG. 3, the membranes 24 are oriented in a horizontal plane and the permeate collector 30 is attached to a plurality of rectangular skeins 8 stacked one above the other. In FIG. 4, the membranes 24 are oriented horizontally in a vertical plane. Depending on the depth of the headers 26 in FIG. 4, the permeate collector 30 may also be attached to a plurality of these membrane modules 28 stacked one above the other. The representations of the membrane modules 28 in FIGS. 2, 3, and 4 have been simplified for clarity, actual membrane modules 28 typically having rectangular skeins 8 much closer together and a large cassette often having many more rectangular skeins 8.

Membrane modules 28 can be created with skeins of different shapes, particularly cylindrical, and with skeins of looped fibres attached to a single header. Similar modules or cassettes can also be created with tubular membranes in place of the hollow fibre membranes 24. For flat sheet membranes, pairs of membranes are typically attached to headers or casings that create an enclosed surface between the membranes and allow appropriate piping to be connected to the interior of the enclosed surface. Several of these units can be attached together to form a cassette of flat sheet membranes.

Commercially available membrane modules 28 include those based on ZW 500 units made by ZENON Environmental Inc. and referred to in the examples further below. Each ZW 500 unit has two rectangular skeins of hollow fibre membranes having a pore size of approximately 0.1 microns oriented as shown in FIG. 2 with a total membrane surface area of approximately 47 square metres. In plan view, each ZW 500 unit is about 700 mm long and about 210 mm wide. Typically, several ZW 500 units are joined together into a cassette to provide a plurality of parallel rectangular skeins 8. For example, a membrane module 28 of 8 ZW 500 units is about 1830 mm by 710 mm, some additional space being required for frames, connections and other related apparatus.

Referring again to FIG. 1, tank water 22 which does not flow out of the tank 20 through the permeate outlet 38 flows out of the tank 20 through a drain valve 40 and a retentate outlet 42 to a drain 44 as retentate 46 with the assistance of a retentate pump 48 if necessary. The retentate 46 is rich in the solids rejected by the membranes 24.

To provide aeration, an air supply pump 50 blows ambient air, nitrogen or other suitable gases from an air intake 52 through air distribution pipes 54 to aerator 56 which disperses scouring bubbles 58. The bubbles 58 rise through the membrane module 28 and discourage solids from depositing on the membranes 24. In addition, where the design of the reactor 10 allows the tank water 22 to be entrained in the flow of rising bubbles 58, the bubbles 58 also create an air lift effect which in turn circulates the local tank water 22.

To provide backwashing, permeate valve 34 and outlet valve 39 are closed and backwash valves 60 are opened. Permeate pump 32 is operated to push filtered permeate 36 from retentate tank 62 through backwash pipes 61 and then in a reverse direction through permeate collectors 30 and the walls of the membranes 24 thus pushing away solids. At the end of the backwash, backwash valves 60 are closed, permeate valve 34 and outlet valve 39 are re-opened and pressure tank valve 64 opened from time to time to re-fill retentate tank 62.

To provide chemical cleaning, a cleaning chemical such as sodium hypochlorite, sodium hydroxide or citric acid are provided in a chemical tank 68. Permeate valve 34, outlet valve 39 and backwash valves 60 are all closed while a chemical backwash valve 66 is opened. A chemical pump 67 is operated to push the cleaning chemical through a chemical backwash pipe 69 and then in a reverse direction through permeate collectors 30 and the walls of the membranes 24. At the end of the chemical cleaning, chemical pump 67 is turned off and chemical pump 66 is closed. Preferably, the chemical cleaning is followed by a permeate backwash to clear the permeate collectors 30 and membranes 24 of cleaning chemical before permeation resumes.

Preferably, aeration and backwashing clean the membranes sufficiently so that permeation can continue over extended periods of time. Permeate backwashes typically last for between 5 seconds and two minutes and are typically performed between once every 5 minutes and once every 3 hours. If such permeate backwashes are performed between more intensive restorative cleaning events, the filtering process is still considered continuous since permeation is only stopped momentarily. Similarly, if chemical cleaning is performed in short duration chemical backwashes while the tank 20 remains full of tank water 22, the process is still considered continuous. In the cases, however, flow rates of permeate 36, retentate 46 and feed water 14 are calculated as average flow rates over a day or such longer period of time as appropriate. In the description of the embodiments and examples which follow, flow rates of processes that are periodically interrupted as described above are measured as average flow rates unless they are described otherwise.

Rapid Flush Deconcentration

Referring still to FIG. 1, in rapid flush deconcentration the filtration process proceeds as a number of repeated cycles which end with a procedure to deconcentrate the tank water 22, the procedure being referred to as a deconcentration. The cycles usually begin at the end of the preceding deconcentration. Some cycles, however, begin when a new reactor 10 is first put into operation or after intensive restorative cleaning or other maintenance procedures which require the tank 20 to be emptied. Regardless, the cycle begins with the tank 20 filled with membranes 24 submerged in tank water 22 with an initial concentration of solids similar to that of the feed water 14.

At the start of a cycle, permeate pump 32 is turned on and sucks tank water 22 through the walls of the membranes 24 which is discharged as filtered permeate 36. Drain valves 40 initially remain closed and the concentration of solids in the tank water 22 rises. While drain valves 40 are closed, the feed pump 12 continues to pump feed water 14 into the tank 20 at about the same rate that filtered permeate 36 leaves the tank such that the level of the tank water 22 is essentially constant during permeation. Aeration and backwashing are provided as required.

After a desired period of time, the tank water 22 is deconcentrated. The desired period of time between deconcentrations may be based on the concentration of solids in the tank water 22 but preferably is chosen to achieve a desired recovery rate. For ZW 500 membrane modules used with typical feed water supplies operating with constant aeration and periodic backwashing between deconcentrations, a recovery rate of 95% (ie. 95% of the feed water becomes filtered permeate) or more can be maintained and is preferred when an operator wishes to discharge minimal amounts of consolidated retentate 46. This recovery rate results in a concentration of solids in the tank water 22 at the start of the deconcentrations approximately 20 times that of the feed water. However, the inventors have observed in tests performed with continuous membrane filtration processes and feed water having turbidity of 0.5 to 0.6 ntu and apparent colour of 33 Pt. Co. units that the rate at which the permeability of membranes decreases over time rises dramatically when the recovery rate is increased to over 93%. Accordingly, if the volume of wasted retentate is a minor factor, then the period between deconcentrations may be chosen to yield a 90% to 95% recovery rate or less. Typical cycle times when using ZW 500 units range from about 2 to 3 hours at a recovery rate of 90% and 4 to 5 hours at a recovery rate of 95% although cycle times will vary for other membrane modules.

The deconcentrations comprise a rapid flush of the tank water 22 while maintaining the level of tank water 22 above the level of the membranes 24 and continuing permeation. To perform the rapid flush deconcentration, the drain valves 40 are opened and retentate pump 48 rapidly draws retentate 46 rich in solids out of the tank 20 if gravity flow alone is insufficient. Simultaneously, feed pump 12 increases the flow rate of feed water 14 into the tank 20 by an amount corresponding to the flow rate of retentate 46 out of the tank 20. Preferably, the retentate 46 is removed at a sufficient rate, assisted by retentate pump 48 if necessary, such that the tank water 22 is not diluted significantly by mixing with incoming feed water 14 before it is flushed out of the tank 20. Some dilution necessarily occurs, and it is preferable to stop the flow of consolidated retentate 46 while the tank water 22 still has a concentration of solids greater than the concentration of solids in the feed water 14 to avoid withdrawing an unacceptably high volume of consolidated retentate 46. However, the volume of consolidated retentate 46 withdrawn may exceed the volume of water in the tank 20. Preferably, aeration and any other source of mixing are turned off to minimize dilution of the retentate 46 and between 100% to 150% of the average volume of the tank water 22 is discharged during the rapid flush deconcentration. If aeration must be left on to provide continued cleaning, a higher volume of tank water 22 is discharged. More preferably, between 100% and 130% of the volume of the average volume of the tank water 22 is discharged. The total discharge time is typically less than 20 minutes and preferably less than 10 minutes. If there is aeration or other mixing at the time of the rapid flush, then between 150% and 300%, more preferably between 150% and 200%, of the average volume of the tank water 22 is discharged and the total discharge time is less than 25 minutes. After the deconcentration, the tank water 22 preferably has less than 40% of the concentration of solids that was present in the tank water 22 prior to the deconcentration. Where the feed water 14 has high turbidity or where high recovery rates are used, however, the tank water 22 after a deconcentration preferably has less than 20% of the concentration of solids that was present in the tank water 22 prior to the deconcentration. Retentate 46 is typically disposed of down a drain 44 to a sewer or to the source of water where it initially came from.

Like a process without deconcentrations, there must still be a balance of solids and water between the feed water 14, retentate 46 and filtered permeate 36 over repeated cycles. Thus for a selected recovery rate, the average amount of solids in the retentate 46 in a process with deconcentrations will be the same as for a process without deconcentrations. Since the retentate 46 is typically diluted in rapid flush deconcentrations, however, the tank water 22 must have a higher concentration of solids immediately before a deconcentration compared to the constant concentration of solids in a fully mixed continuous bleed process. By replacing at least a substantial portion of the existing tank water 22 with fresh feed water 14, however, permeation continues in the next cycle with relatively clean tank water 22 until solids again build up in the tank water 22 and another deconcentration is performed. Thus the average concentration of solids in the tank water 22 over time is an intermediate value between that of the feed water 14 and the consolidated retentate 46 and less than the constant concentration of solids in a fully mixed continuous bleed process at the same recovery rate. While the tank water 22 has a lower concentration of solids the membranes foul less rapidly. Accordingly, increased flux of permeate 36 is observed at a set transmembrane pressure or a higher transmembrane pressure can be used at the beginning of a cycle without excessive fouling of the membranes 24.

Preferably, a reduced flow rate of air bubbles 58 is initially supplied to the tank 20 when the concentration of solids is low and the membranes 24 foul more slowly. As the concentration of solids rises in the tank water 22, the flow rate of air is also increased. Alternately, aeration is only provided directly before the deconcentration. In this way, excess air is not supplied while the concentration of solids is low in the tank water 22. Similarly, the frequency or duration of backwashing may be decreased when the concentration of solids in the tank water 22 is low to minimize loss in production due to backwashing. To the extent that aeration can be made to coincide with backwashing, the effectiveness of the aeration is increased since is does not have to work against the transmembrane pressure.

Despite the aeration, periodic backwashing, and periodic deconcentrations of the tank water 22, long term fouling of the membranes may still occur, although more slowly than in a process without deconcentrations. As long term fouling occurs, power to the permeate pump 32 may be increased to increase the transmembrane pressure across the walls of the membranes 24 to compensate for the reduced permeability. Eventually, a specified maximum transmembrane pressure for the system or a minimum tolerable permeability of the membranes 24 will be reached. At this time, intensive restorative cleaning is done. For ZeeWeed (a trade mark) brand membranes 24, intensive cleaning is preferably done when the transmembrane pressure exceeds 54 kPa or the permeability drops below 200 litres per square metre per hour per bar (L/m2/h/bar) at normal operating temperatures. The tank is typically emptied during the intensive maintenance cleaning, but this is independent of the periodic deconcentrations and occurs only infrequently, between once every two weeks to once every two months.

Long Aerated Filter Trains

Figure 5A:
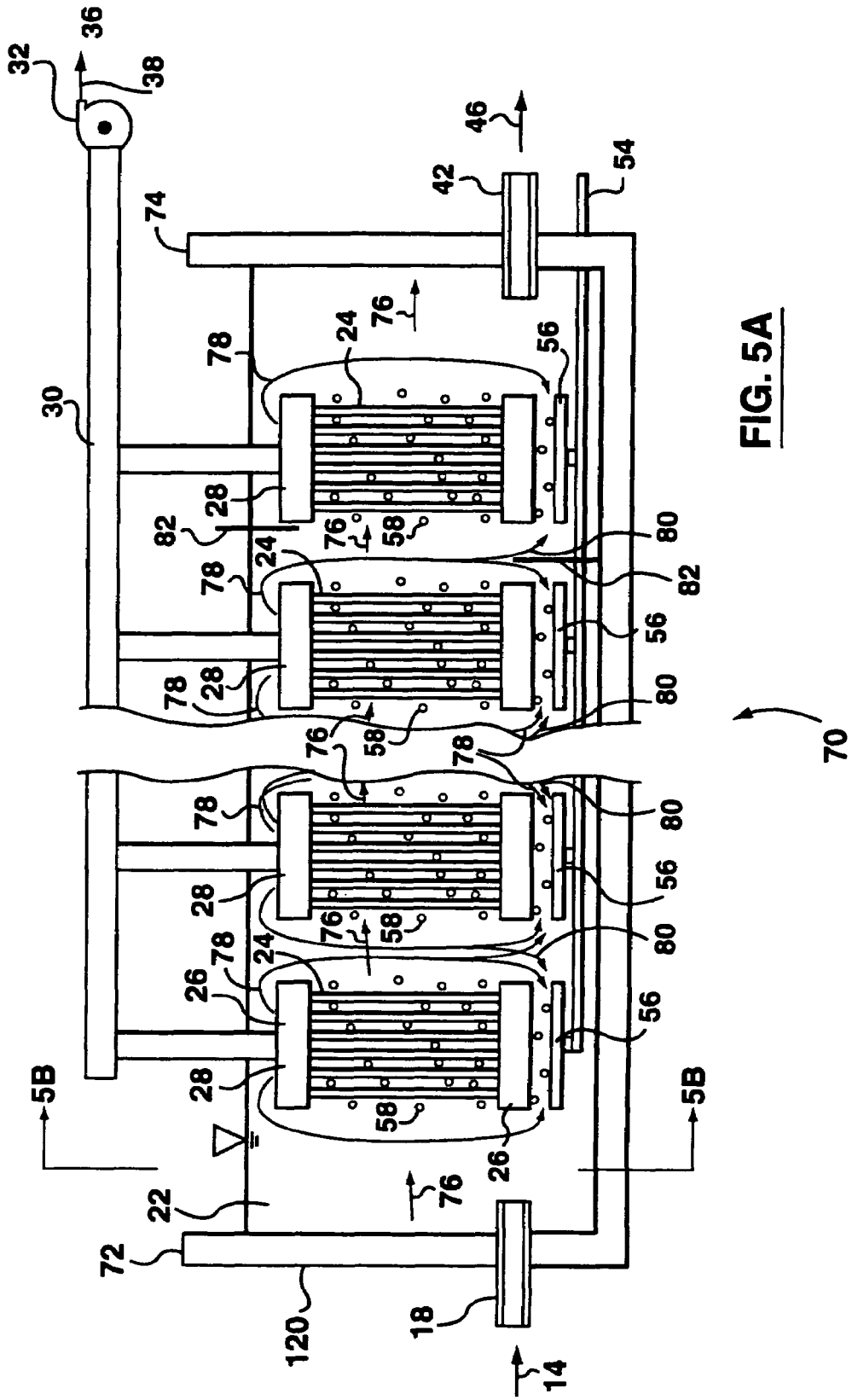
FIG. 5A is a schematic representation of an embodiment of the invention with a long aerated filtration train.
Figure 5B:
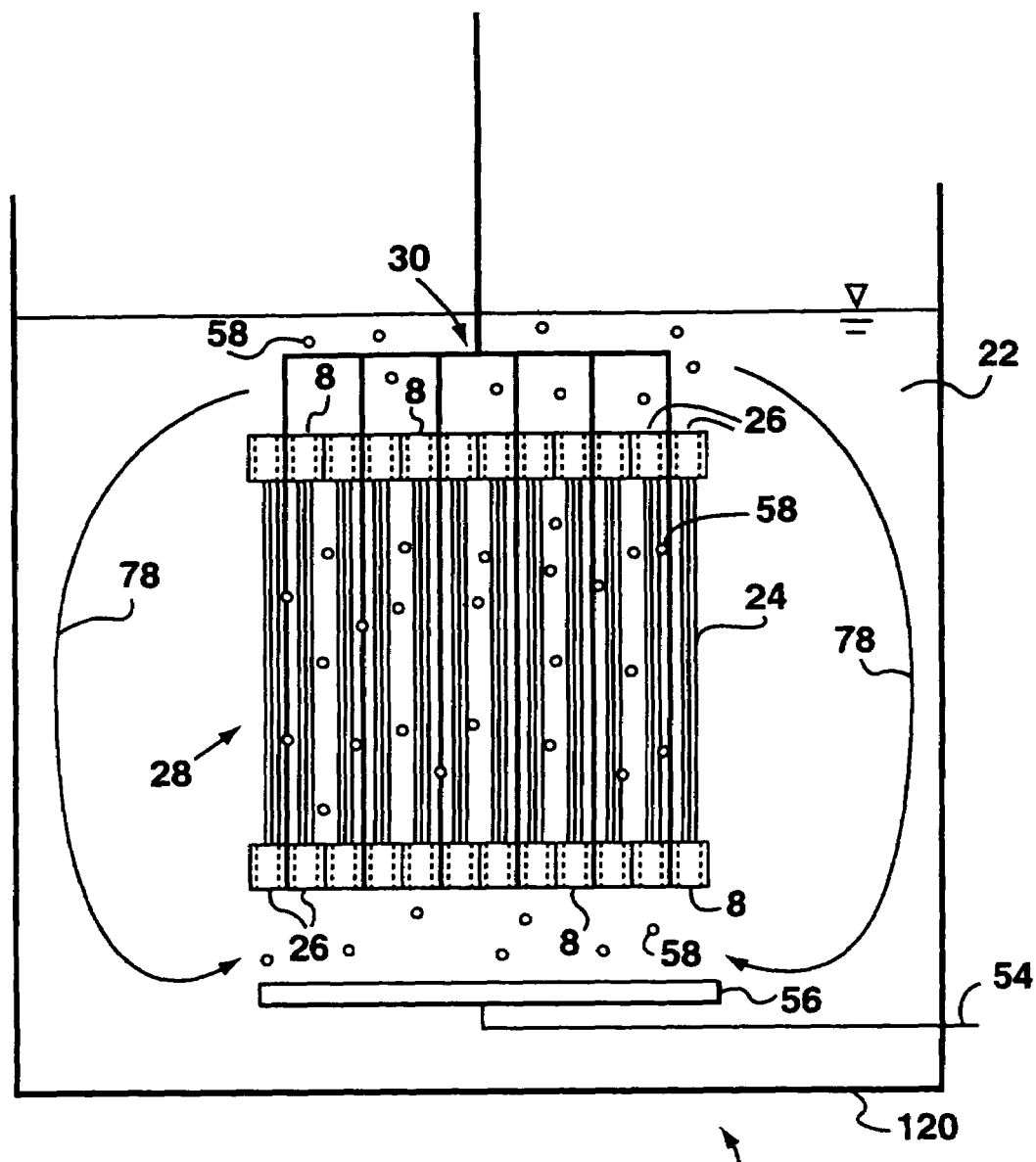
FIG. 5B is a schematic cross section of the embodiment of FIG. 5A.

Referring now to FIGS. 5A and 5B, a portion of another embodiment is shown. Components not illustrated in FIG. 5A or 5B are similar to those of FIG. 1 and reference may be had to FIG. 1 to understand the general operation of the present embodiment. In this embodiment, a second reactor 70 has a rectangular (in plan view) second tank 120 with an inlet end 72 and an outlet end 74. Preferably, the inlet end 72 is at one short end (as seen in plan view) of the second tank 120 and has an inlet 18 and the outlet end 74 is at the opposite short end of the second tank 120 and has a retentate outlet 42. During permeation, the second tank 120 is filled with tank water 22 which moves generally in a general flow path 76 between the inlet 18 and the retentate outlet 42, the word general meaning that the actual flow path of a volume of tank water 22 may deviate substantially from the flow path 76 as will be described below, but the average flow of tank water 22 has at least a component in the direction of the flow path 76.

Membrane modules 28 are arranged in the second tank 120 in series along the flow path 76. Typically the membrane modules 28 are spaced apart horizontally along the flow path 76 to allow room for associated apparatus, installation and maintenance, and to provide a small movable volume of tank water 22 between each membrane module 28. This space is preferably less than one half of the length (measured along the flow path 76) of the membrane module 28 and for ZW 500 units is typically about 20 cm. Referring to FIGS. 5A and 5B, greater space is provided above, below and beside the membrane modules 28. For example, the distance between the membrane modules 28 and the long walls of the second tank 120 is typically about one half of the width of the membrane modules 28 (measured perpendicular to the flow path 76). Preferably, 6 or more membrane modules 28 in series are used. More preferably, long trains of 12 or 16 or more membrane modules 28 in series are used. Where a large system is required, each membrane module 28 is typically of the size of a cassette of 6 to 12 ZW 500 units. The total length of all of the membrane modules 28 (measured along the flow path 76) excluding the space between them (also measured along the flow path 76) is at least twice, and preferably at least four times, the width of the membrane modules 28 (measured perpendicular to the flow path 76).

Feed water 14 continuously enters the second tank 120 at the inlet 18. Permeate pump 32 continuously withdraws filtered permeate 36 through membranes 24 of each membrane module 28 and consolidated retentate 46 continuously leaves the second tank 120 through retentate outlet 42. The path of a volume of tank water 22, however, passes in series through some or all of the membrane modules 28. However, since solids are rejected by the membranes 24, the concentration of solids in the volume of tank water 22 increases downstream of each membrane module 28 it passes through. Thus the concentration of solids in the volume of tank water 22 increases from the inlet 18 to the retentate outlet 42 along its flow path. Downstream of the membrane module 28 nearest to the retentate outlet 42, the tank water 22 has a high concentration of solids of at least five times that of the feed water 14, preferably at least 14 times that of the feed water 14 and more preferably at least 20 times that of the feed water 14. Conversely, tank water 22 near the inlet 18 has a concentration of solids similar to that of the feed water 14. In long trains of membrane modules 28 in which the length of the membrane modules 28 (excluding the spaces between them) is four or more times their width, up to 75% of the membrane modules 28 operate in tank water with minimal solids concentration, the concentration of solids rising sharply only near the outlet 42.

Since the concentration of solids in the tank water 22 rises from the inlet 18 to the retentate outlet 42, membrane modules 28 near the inlet 18 operate in water that has a substantially lower concentration of solids than the consolidated retentate 46 which flows out of the retentate outlet 42. The last membrane modules 28 (in the direction of the flow path 76) have a higher concentration of solids in the tank water 22 around them and are therefore likely to have reduced permeabilities. The permeate pump 32 may be placed near the outlet 42 so that the last membrane modules 28 will receive higher transmembrane pressures (relative to more distant membrane modules 28) to overcome their reduced permeability and provide more nearly even permeate flux from the set of membrane modules. The average concentration of solids in the tank water 22 is an intermediate concentration in relation to the concentration of solids in the feed water 14 and consolidated retentate 46. If the length of all of the membrane modules 28 (excluding spaces between them) is more than twice their width, the area of significantly reduced concentration can include more than half of the second tank 120. Thus consolidated retentate 46 can be withdrawn having a high concentration of solids but the average concentration of solids in the tank water 22 is significantly less than the concentration of solids in the consolidated retentate 46. The average permeability of the membrane modules 28 is increased as fouling occurs less rapidly. Since the permeability of the membranes 24 decreases rapidly when the concentration of solids is high, it is preferable if most membrane modules 28 operate in tank water 22 having a concentration of solids less than 14 times that of the feed water and more preferably less than 10 times that of the feed water.

As mentioned above, the path of a volume of tank water 22 passes in series through some or all of the membrane modules 28. This effect would not occur if the second reactor 70 operated like a completely stirred tank reactor. To counter this possibility, aeration is provided during the entire permeation cycle. While aeration is normally considered to be a mixing agent, in the second reactor 70 the inventors believe that the aeration (or alternately an agitator such as a rotating propeller) provided substantially throughout permeation encourages tank water 22 to flow through a plurality of membrane modules 28 sequentially in relation to the flow path when as will be explained below.

With the inlet 18 and outlet 42 at opposite ends of the tank, the tank flow 76 must have an average substantially horizontal flow from inlet 18 to outlet 42. The membrane modules 28, however, significantly resist such horizontal flow. Accordingly, the bulk of the horizontal flow has a tendency to by-pass the membrane modules by flowing beneath, over or beside them. The inventors believe that if tank water 22 readily by-passed the membrane modules 28, it would be difficult to avoid substantial mixing in the tank 20.

Assuming negligible horizontal flow through the membrane modules 28, the horizontal velocity of by-pass flow typically ranges from about 0.05 to 0.3 m/s, decreasing towards the outlet 42. Typical vertical velocities of tank water 22 upwards through the membrane module 28 are of a comparable magnitude, typically 0.05 to 0.2 m/s. Referring to FIGS. 5A and 5B, a cassettes flow 78 is created in which tank water 22 is drawn up into the bottom of a membrane module 28 released from the top of the membrane module, flows towards the outlet 42 while descending to the bottom of the tank 20 where it is entrained in a second membrane module 28 and so on. The cassette flow 78 has a component flowing downwards besides the membrane modules 28 (as shown in FIG. 5B) and a component flowing downwards between the membrane modules 28 (as shown in FIG. 5A). The inventors have observed that the component flowing downwards besides the membrane modules 28 is about 90% of the cassette flow 78. The inventors believe that the flow component flowing downwards between the membrane modules 28 is much smaller than the flow downwards besides the membrane modules 28 because distance to the walls of the second tank 120 is greater than the distance between membrane modules 28 and each membrane module 28 is surrounded by an upwards flow of tank water 22. Together, these factors result in a higher shear force inhibiting tank water 22 from flowing downwards between membrane modules 28.

Cassette flow 78 created within a first membrane module 28 and flowing downwards between membrane modules 28 likely mixes in part with tank water 22 similarly flowing downwards in the cassette flow 78 of an adjacent membrane module 28 and becomes part of the cassette flow 78 of the adjacent membrane module 28. Thus, a mixing flow 80 of tank water 22 circulating around a membrane module 28 may be drawn towards the inlet 18 by an upstream membrane module 28 or towards the retentate outlet 42 by a downstream membrane module 28. The degree of mixing in the second tank 120 may be expressed in relation to a recirculation rate defined as the flow rate of the cassette flow 78 through the centre of the membrane modules 28 divided by the flow rate of feedwater. Surprisingly, in modelling experiments to be described below, if the cassette flow 78 produces no net flow towards the inlet 18 or retentate outlet 42 (i.e. it is symmetrical about the membrane module 28) then the concentration of solids in the tank water 22 still increases along the flow path 76 even at unusually high recirculation rates and even under the assumption that the component of cassette flow 78 downwards between adjacent membrane modules 28 is unusually high.

Although it is usually unnecessary, an operator may minimize mixing between adjacent membrane modules 28 so that the concentration of solids in the second tank 120 will rise only near the retentate outlet 42 of the second tank 120 resulting in increased permeability in a greater number of membrane modules 28. Alternately, the second tank 120 can be made of a plurality of filtering zones wherein the outlet of a first filtering zone is connected to the inlet of a downstream filtering zone. The filtering zones may be created by breaking the second tank 120 into a plurality of containers or with baffles 82 at the upper upstream edge or lower downstream edge of a membrane module 28 to restrict backflows 80 flowing towards the inlet 18. Preferably, baffles are installed only on membrane modules 28 located near the retentate outlet 42 where the rate of flow in the flow path 76 is reduced.

Membrane Modules in Series

Figure 6:
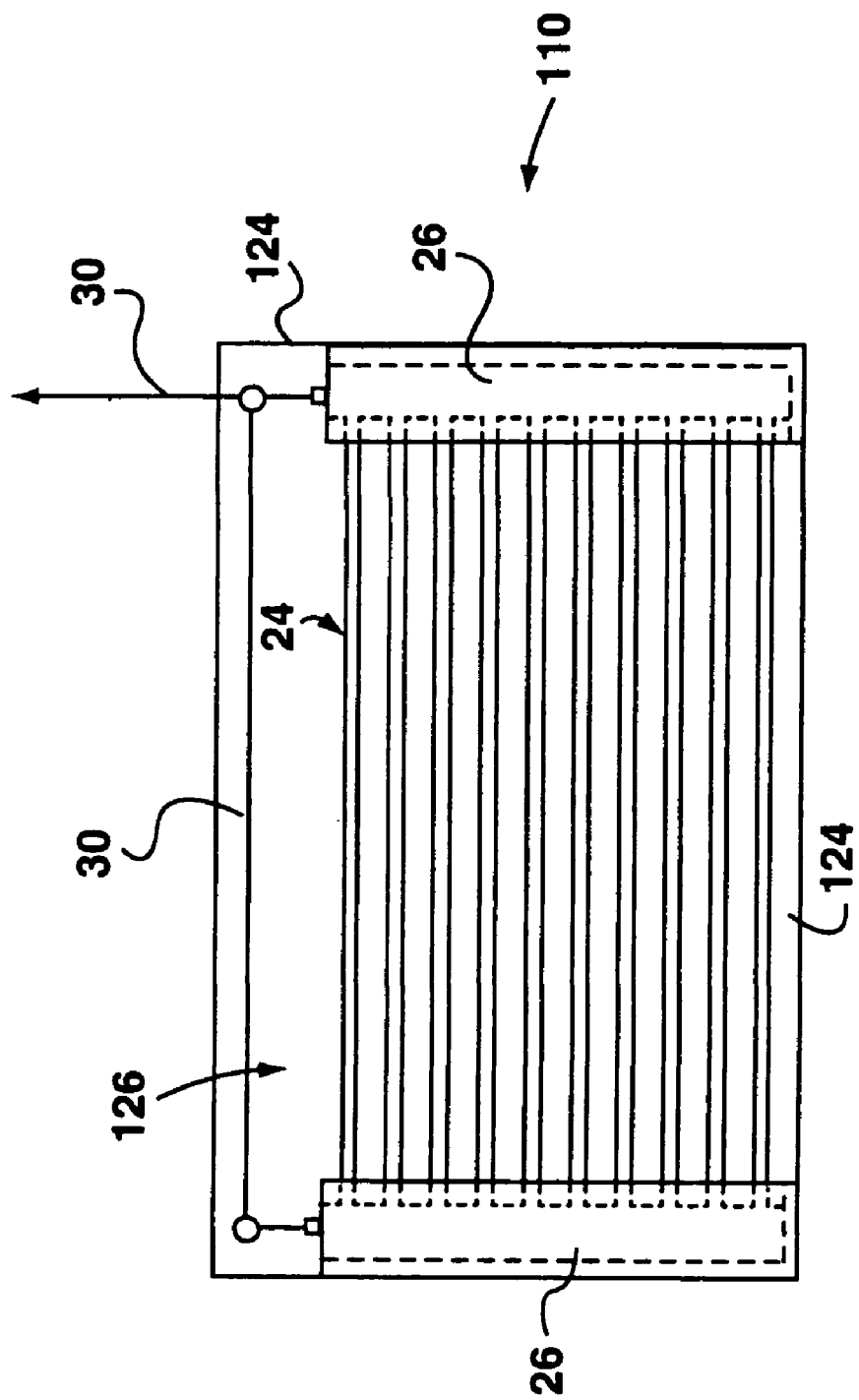
FIG. 6 is an elevation view of a membrane module adapted for use with a filtering reactor having membrane modules in series.
Figure 7:
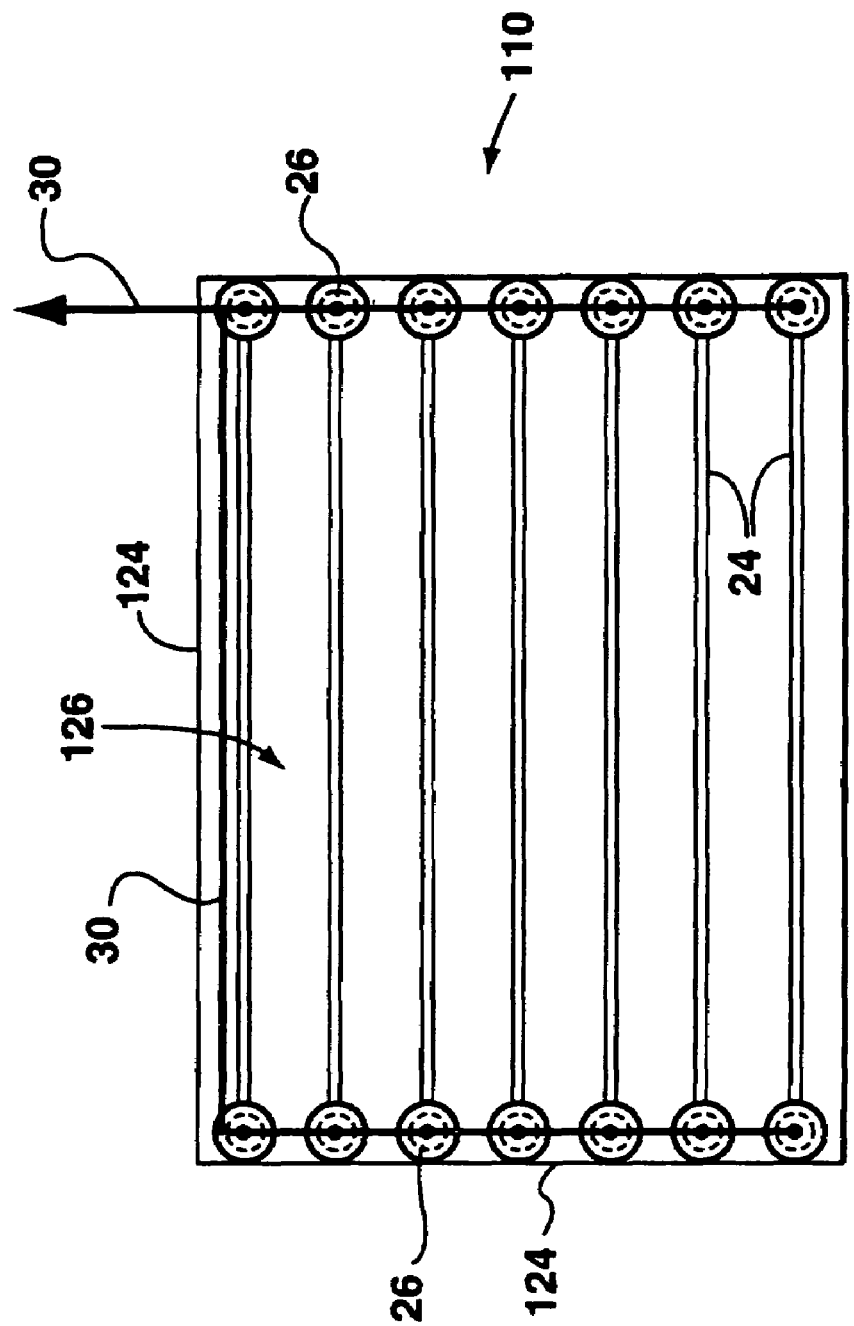
FIG. 7 is a plan view of the membrane module of FIG. 2.

Referring now to FIGS. 6 and 7, another second membrane module 110 having hollow fibre membranes 24 is shown in elevation and plan view respectively. The membranes module 110 is similar to that shown in FIG. 4 but the perimeter of the second membrane module 110 is surrounded by a non-porous casing 124 which defines a vertically oriented flow channel 126 through the second membrane module 110. Similar modules can be created with membrane modules 28 as shown in FIGS. 2, 3 and 4 or with tubular or flat sheet membranes as described above.

Figure 8:
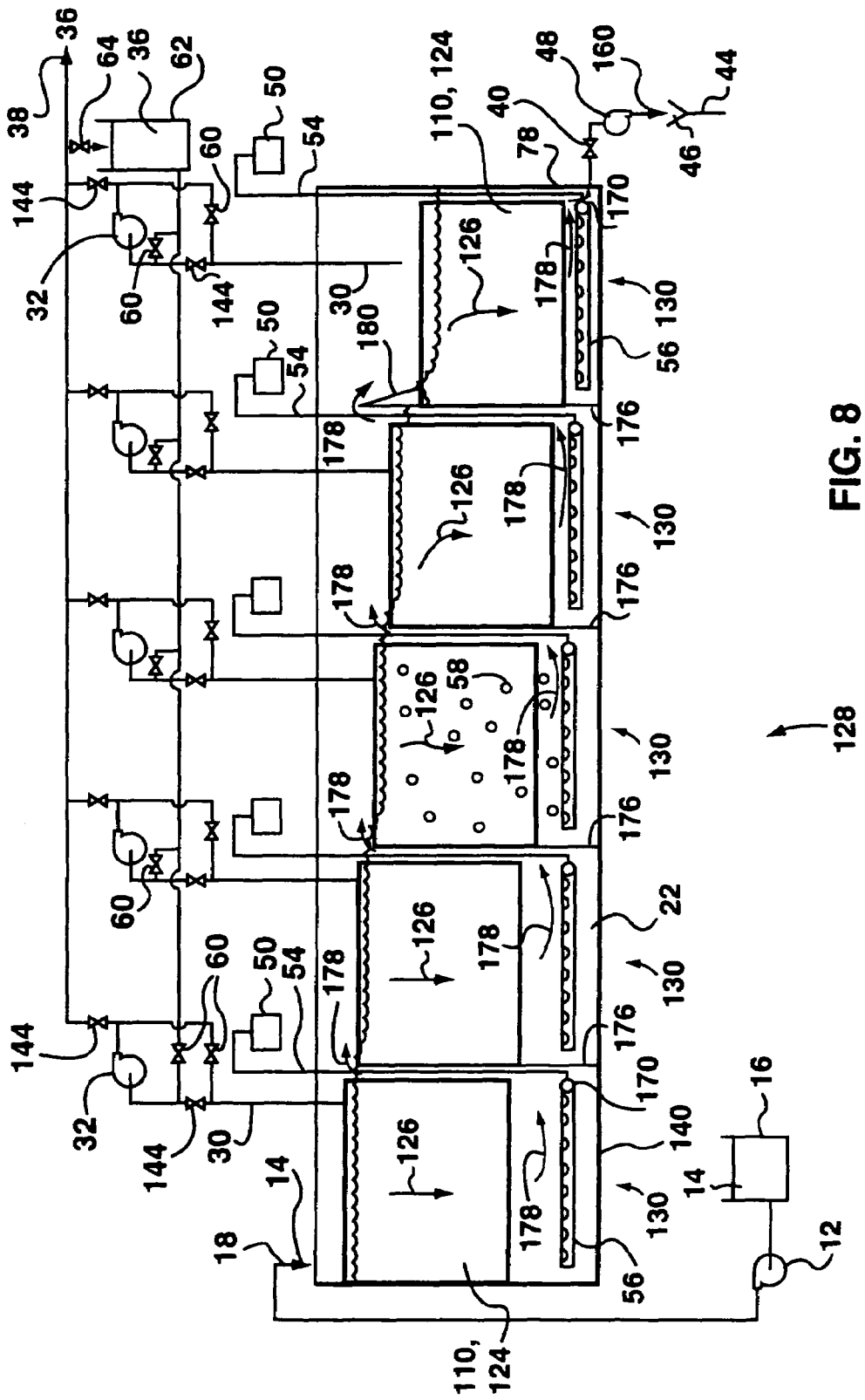
FIG. 8 is a schematic representation of a filtering reactor having membrane modules in series.

Referring now to FIG. 8, a third reactor 128 has a plurality of second membrane modules 110 in a plurality of filtration zones 130. The third reactor 128 has a feed pump 12 which pumps feed water 14 to be treated from a water supply 16 through an inlet 18 to a third tank 140 where it becomes tank water 22. During permeation, the feed pump 12 is operated to keep tank water 22 at a level which covers the membranes 24. The permeate collector 30 of each second membrane module 110 is connected to a set of pipes and valves as shown including a pair of permeate valves 144 and a pair of backwash valves 60. To withdraw permeate from a second membrane module 110, its associated permeate valves 144 are opened while its backwash valves 60 are closed and an associated permeate pump 32 is turned on. The resulting suction creates a transmembrane pressure ("TMP") from the outside of the membranes 24 to their lumens 25. The membranes 24 admit a flow of filtered permeate 36 which is produced for use or further treatment at a permeate outlet 38. From time to time, a permeate storage valve 64 is opened to maintain a supply of permeate 36 in a permeate storage tank 62. Such an arrangement allows permeate 36 to be withdrawn from each filtration zone 130 individually. Preferably, the permeate pumps 32 are operated to produce a similar flux of permeate 36 from each filtration zone 130. Since solids concentration in each filtration zone 130 differs, as will be explained further below, this typically requires each permeate pump 32 to be operated at a different speed. Alternatively, the second membrane modules 110 in different filtration zones 130 can be connected to a common permeate pump 32. This will result in some variation in flux between the filtration zones 130 (because the downstream second membrane modules 110 are likely to foul faster), but the amount of variation can be minimized by locating the permeate pump 32 near the outlet 42 as described above or by variations in aeration, backwashing and packing density to be described below. With any of these techniques, the second membrane modules 110 can be made to have similar permeate fluxes.

Tank water 22 which does not flow out of the third tank 140 through the permeate outlet 38 flows out of the third tank 140 through a drain valve 40 and retentate outlet 160 to a drain 44 as consolidated retentate 46. Additional drains in each filtration zone 130 (not shown) are also provided to allow the third tank 140 to be drained completely for testing or maintenance procedures. The consolidated retentate 46 is rich in the solids rejected by the membranes 24. Flow of the consolidated retentate 46 may be assisted by a retentate pump 48 if required. The inlet 18 and retentate outlet 160, however, are separated by the filtration zones 130. Partitions 176 at the edges of the filtration zones 130 force the tank water 22 to flow sequentially through the filtration zones 130 in a tank flow pattern 178. The partitions 176 have decreasing heights in the direction of the tank flow pattern 178 such that a difference in depth from one filtration zone 130 to the next drives the tank flow pattern 178. The difference in depth between partitions 176 varies with different applications, but is unlikely to be more than 1 m between the first and last partition 176. Alternatively, flow from one filtration zone 130 to the next could be through conduits and driven by differences in depth from one filtration zone 130 to the next or driven by pumps.

While in normal operation, feed pump 12 substantially continuously adds feed water 14 to the third tank 140 while one or more permeate pumps 32 substantially continuously withdraw permeate 36. The process is typically operated to achieve a selected recovery rate defined as the portion of feed water 14 removed as permeate 36 (not including permeate 36 returned to the third tank 140 during backwashing to be described further below) expressed as a percentage. The selected recovery rates is typically 90% or more and preferably 95% or more.

As the tank water 22 moves from one filtration zone 130 to the next, the solids concentration increases as solids lean permeate 36 is removed. This effect may be illustrated by a simplified example in which the third reactor 128 shown in FIG. 8 is operated at an overall recovery rate of 95%. 100 flow units of feed water 14 having a concentration of 1 enters the third tank 140 at the inlet 18. According to the recovery rate, 95 flow units leave the third tank 140 as permeate 36 while 5 flow units leave the third tank 140 as consolidated retentate 46. Assuming equal production from each second membrane module 110, 19 flow units leave the third tank 140 as permeate 36 in each filtration zone. Assuming further (a) that all solids are rejected by the membranes 24 and (b) that the concentration of solids in a filtration zone 130 equals the concentration of solids in the flow to the next filtration zone 130, the following chart is generated by applying a mass balance of fluid and solids to each filtration zone 130.

| Filtration Zone | Flow In | Concentration in inflow | Permeate Flow out | Flow to Next Zone | Maximum Concentration in Zone |
|---|---|---|---|---|---|
| 1 | 100 | 1 | 19 | 81 | 1.2 |
| 2 | 81 | 1.2 | 19 | 62 | 1.6 |
| 3 | 62 | 1.6 | 19 | 43 | 2.3 |
| 4 | 43 | 2.3 | 19 | 24 | 4.2 |
| 5 | 24 | 4.2 | 19 | 5 (to drain) | 20 |

In comparison, if there were no filtration zones 130 and the entire third tank 140 was fully mixed, the tank water 22 would have a concentration 20 times that of the feed water 14 throughout. By providing a series of sequential filtration zones 130 between the inlet 18 and retentate outlet 160, the concentration of solids in the tank water 22 in most of the filtration zones 130 is significantly reduced. The reduced concentration of solids results in significantly reduced fouling of the second membrane modules 110 in the applicable filtration zones 130. Among other benefits, less chemical cleaning is required for these second membrane modules 110. Further, reduced aeration and backwashing routines are sufficient for individual filtration zone 130 or groups of filtration zones 130 with reduced concentrations of solids.

Unlike the embodiment above without separate filtration zones 130, aeration is not required to prevent tank water 22 from by passing the membrane modules and so less or even no aeration can be provided during substantial periods. Further, by forcing tank water 22 to flow through the casings 124, aeration is not required to create local circulation of tank water 22 around second membrane modules 110. Accordingly, space in the third tank 140 is not required for downcomers and the second membrane modules 110 can occupy 80% or more of the plan area or footprint of the tank 140.

Aeration is provided, nevertheless, to scour the membranes 24 which can occur without creating an air lift effect in the tank water 22. To provide aeration, an air supply 50 associated with each filtration zone 130 is operable to blow air, nitrogen or other suitable gases through air distribution pipes 54 to a header 170 attached to a plurality of aerators 56 below the second membrane module 110. During aeration, the aerators 56 emit scouring bubbles 58 below the second membrane module 110 which rise through the membranes 24. Thus aeration can be provided to each filtration zone 130 individually.

The second membrane module 110 in each filtration zone 130 can also be backwashed individually by closing its associated permeate valves 144 and opening its associated backwash valves 60. The associated permeate pump 32 (or alternatively, a separate pump) is then operated to draw permeate 36 from the permeate storage tank 62 and pump it through the permeate collector 30 and, ultimately, through the membranes 24 in reverse direction relative to permeation. Preferably the second membrane modules 110 in adjacent filtration zones 130 are not backwashed at the same time. The backwash typically lasts for between 15 seconds and one minute and involves a flux one to three times the permeate flux but in a reverse direction. Accordingly, the level of the tank water 22 in the backwashed filtration zone 130 rise temporarily causing more tank water 22 to flow to the next filtration zone 130. Preferably, the downstream partition 176 in each filtration zone is sufficiently lower than the upstream partition 176 such that tank water 22 does not flow over an upstream partition 176 during backwashing.

To achieve a higher density of membranes 24 in the third tank 140, the second membrane modules 110 are sized to nearly fill each filtration zone. Further, the second membrane modules 110 are positioned such that tank water 22 or feed water 14 flowing into a filtration zone 130 must flow first through the flow channel 126 of the second membrane module 110. The tank flow 178 thus generally flows downwards through each second membrane module 110 then upwards outside of each second membrane module 110 and over the downstream partition 176. Accordingly, the tank flow 178 is transverse to the membranes 24 and generally inhibits solids-rich zones of tank water 22 from forming near the membranes 24. During backwashing, the tank flow 178 may temporarily flow upwards through the second membrane module 110 if the top of the casing 24 around the second membrane module 110 is located near the normal level of the tank water 22. Such reverse flow does not significantly effect the general tank flow 178 but it is preferred if during backwashing the tank water 22 does not overflow the second membrane module 110. In this way, after backwashing stops, there is a momentarily increased tank flow 178 which assists in moving solids from near the bottom of the second membrane module 110 to the next filtration zone 130. For second membrane modules 110 with minimal aeration, the tank flow through a second membrane module 110 approaches a plug flow and there is an increase in concentration of solids as the tank water 22 descends through the second membrane module 110. Accordingly, membranes 24 near the top of the second membrane module 110 experience a concentration of solids even lower than that predicted by the chart above, and comparatively more solids attach to the lower membranes 24. During aeration, the bubbles 56 rise upwards against the tank flow 178 and no space for downcomers is required in the filtration zones 130.

Combining Long Aerated Filter Trains and Membrane Modules in Series with Rapid Flush Deconcentration.

In another embodiment of the invention, the embodiments described with reference to FIGS. 5 and 8 are operated in cycles including rapid flush deconcentrations. The resulting temporal reduction in concentration of solids produced by the deconcentrations works to further the effect of the spatial reductions in concentration of solids. With reference to FIGS. 5A and 5B or 8, at the start of a cycle, the second tank 120 or third tank 140 is filled with tank water 22. Filtered permeate 36 is withdrawn from the second tank 120 or third tank 140 while drain valves 40 remain at least partially and preferably completely closed so that the tank water 22 becomes more concentrated with solids until a deconcentration is indicated as described above.

Permeation continues while the second tank 120 or third tank 140 is deconcentrated by simultaneously withdrawing consolidated retentate 46 from the second tank 120 or third tank 140 and increasing the rate that feed water 14 enters the second tank 120 or third tank 140 to maintain the level of tank water 22 above the membranes 24 during the flushing operation. When the tank water 22 is deconcentrated by a rapid flush while permeation continues, the volumes of water removed from the second tank 120 or third tank 140 can be the same as those described above. Preferably, however, since only the downstream portion of the second tank 120 or third tank 140 contains tank water 22 at a high concentration of solids, lower flush volumes may be used since only the downstream part of the tank water 22 requires deconcentration. With the apparatus of FIG. 8 or with the apparatus of FIGS. 5A and 5B in which aeration is turned off during the deconcentration, between 20% and 75% of the volume of the tank water 22 is preferably removed and more preferably between 20% and 50%. If there is aeration at the time of the deconcentration with the apparatus of FIGS. 5A and 5B, between 40% and 150% of the volume of the tank water 22 is preferably flushed, and more preferably between 40% and 75%. With the apparatus of FIG. 8, deconcentrations are preferably performed directly after backwashing events so that the increased flux of the tank flow 178 will entrain more solids.

Deconcentrations can also be performed by stopping permeation and the flow of feed water 14 into the second tank 120 or third tank 140 while retentate 46 is withdrawn. The level of the tank water 22 drops and so the second tank 120 or third tank 140 must first be refilled before permeation can resume. As suggested above, this process avoids dilution of the retentate 46 with feed water 14 but also interrupts permeation. In the apparatus of FIG. 8, however, the last filtration zone 130 can be drained separately while permeation is stopped in that filtration zone 130 only. Compared to a process in which a tank is emptied, such deconcentrations are performed more frequently but involve less volume each which reduces the capacity of the drain 44 required. In addition, this technique advantageously allows tank water 22 rich in solids to be withdrawn while permeating through most membrane modules 28 and without diluting the retentate 46. While the flow of feed water 14 can be stopped completely while the last filtration zone 130 is emptied, the flow path over the last partition 176 is preferably fitted with a closure such as a gated weir 180 or a valved conduit. The closure is shut at the start of the deconcentration which prevents tank water 22 from flowing over the partition 176 after the drain valve 40 is opened. Retentate pump 48 may be operated to speed the draining if desired. Feed water 14 continues to be added to the third tank 140 during the deconcentration until the level of the tank water 22 rises in the downstream filtration zones 130 to the point where appreciable reverse flow may occur across the partitions 176. After the last filtration zone 130 is emptied, retentate pump 48 is turned off (if it was on) and drain valve 40 is closed. The closure is opened releasing an initially rapid flow of tank water 22 which fills a portion of the last filtration zone 130. The flow of feed water 14 is increased until the remainder of the last filtration zone 130 is filled. To avoid damage to the membranes 24 during rapid flows of tank water 22, baffles (not shown) are preferably installed above the second membrane modules 110 to direct the flow and dissipate its energy.

Tapered Aeration

With the embodiments discussed with reference to FIGS. 5 and 8, additional advantage is achieved by varying the amount of aeration along the second tank 120 or third tank 140. For this purpose, the apparatus in FIGS. 5A and 5B is fitted with a separate aeration system for each membrane module 28 as shown in FIG. 8, the connection between the air distribution pipes 54 and selected aerators 56 are fitted with restricting orifices or, preferably, each aerator 56 has a flow control valve associated with it. Membrane modules 28 or second membrane modules 110 operating in tank water 22 with low concentration of solids are aerated less forcefully, preferably based on the concentration of solids 22 in the tank water surrounding each membrane module 28 or second membrane module 110. The furthest upstream membrane module 28 or second membrane module 110 is exposed to the lowest concentration of solids and thus receives the least amount of air, subject in the embodiment of FIGS. 5A and 5B to the need to entrain tank water 22 that would otherwise by-pass the membrane modules 28. The most downstream membrane module 28 or second membrane module 110 is exposed to the highest concentration of solids and receives the most aeration.

Typically, all aerators 56 are built to the same design and are rated with the same maximum air flow that can be passed through them. The minimum amount of air flow is typically about one half of the rated maximum air flow, below which the aerator 56 may fail to aerate evenly. Preferably, the upstream one half or two thirds of the membrane modules 28 or second membrane modules 110 are aerated at 50% to 60% of the rated capacity of the aerators 56 and the remaining membrane modules 28 or second modules 110 are aerated at 80% to 100% of the rated capacity, the increase being made either linearly or in a step form change. Such a variation approximately follows the increase in solids concentration in the tank water 22.

Tapered Backwashing

Additionally or alternately, tapered backwashing may be employed. Membrane modules 28 or second membrane modules 110 operating in tank water 22 with low concentration of solids require less backwashing. The furthest upstream membrane module 28 or second membrane module 110 is exposed to the lowest concentration of solids and receives the least amount of backwashing whereas the most downstream membrane module 28 or second membrane module 110 is exposed to the highest concentration of solids and receives the most backwashing. The amount of backwashing is typically increased between these extremes using a lower amount of backwashing for the upstream one half or two thirds of membrane modules 28 or second membrane modules 110 and then increasing either linearly or in step form to a higher amount for the remaining membrane modules 28 or second membrane modules 110. For this purpose, the apparatus in FIGS. 5A and 5B is fitted with a separate backwashing system for each membrane module 28 as shown in FIG. 8.

Backwashing can be varied in both frequency or duration. Precise parameters depend on the feed water 14 and other variables but typically range from a 10 second backwash once an hour to a 30 second backwash once every five minutes, the lower amount being near the former regime and the higher amount being near the latter.

Flow Reversal

In addition or alternatively, to reduce excessive loss of permeability (because some long term fouling effects are irreversible) and to prevent uneven damage to different membrane module 28 when tapered aeration is used, the direction of tank flow 78 may be reversed periodically by providing an inlet 18 and retentate outlet 46 at opposite ends of the second tank 120 or third tank 140. Preferably the reversal is done after periodic chemical cleaning which is required approximately every two weeks to two six months and often requires draining the second tank 120 or third tank 140. Such flow reversal allows the membranes 24 near the ends of the second tank 120 or third tank 140 to be operated at times in solids lean tank water 22 which substantially increases their useful life. Such flow reversal can be accomplished in the embodiment of FIG. 8 with some modification but is inconvenient, the method being more suited to the embodiment of FIGS. 5A and 5B.

Variable Packing Density

In general, membrane modules 28 or second membrane modules 110 with lower packing density are preferred in solids rich tank water 22. The reduced packing density allows bubbles 58 to reach the membranes 24 more easily and increases the cleaning or fouling inhibiting effect of aeration. For solids lean tank water 22, higher packing density is desirable as more membrane surface area is provided for a given volume of second tank 120 or third tank 140. Alternatively or additionally, the packing density of downstream membrane modules 28 or second membrane modules 110 is reduced relative to upstream membrane modules 28 or second membrane modules 110 with a corresponding change in the size of the filtration zones 130. Preferred upstream packing densities vary from 20% to 30%. Preferred downstream packing densities vary from 10% to 20%.

Alternate Tank Shapes

Figure 9:
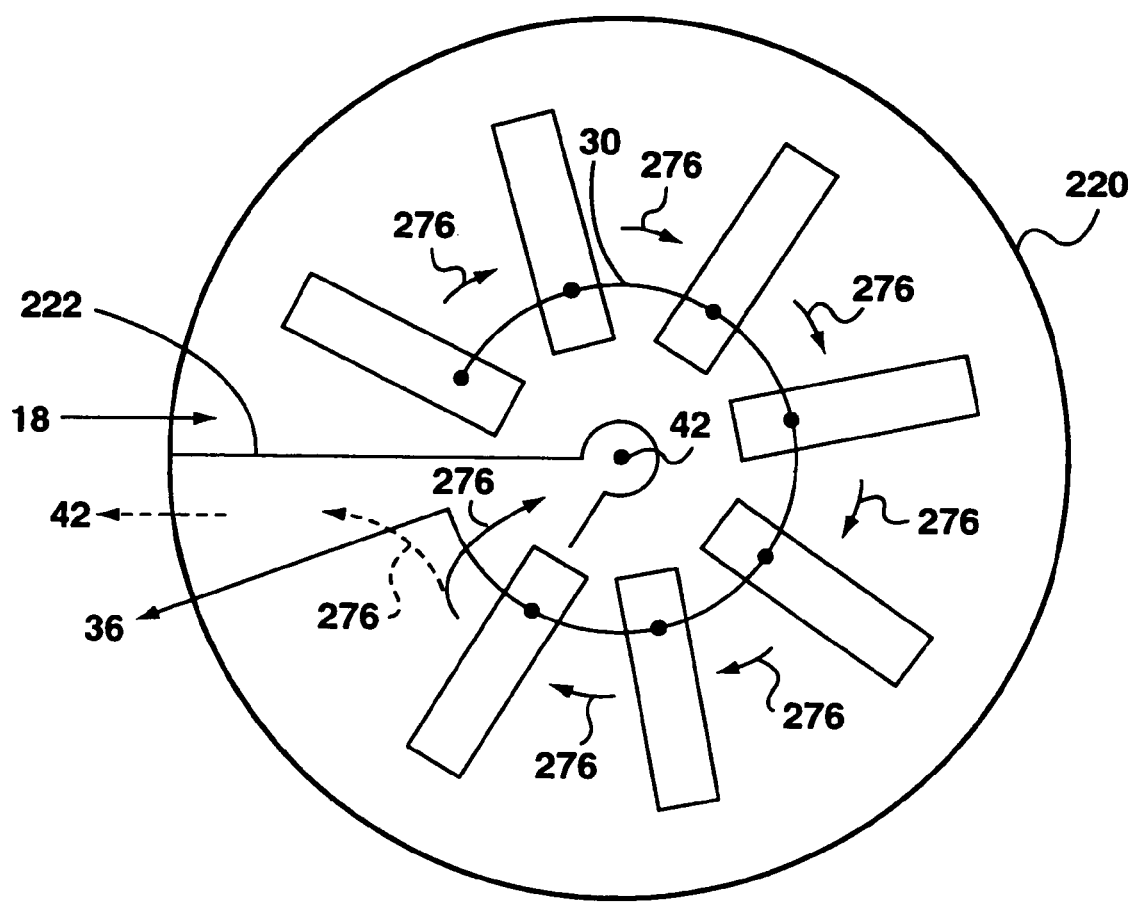
FIGS. 9 and 10 show tanks with alternate shapes.

Referring to FIG. 9, a round tank 220 is used. Inlet 18 is located at one point on the circumference of the tank 220 and the retentate outlet 42 is located in the middle of the tank 220, or alternately (as shown in dashed lines) at another point on the circumference of the tank 220. Membrane modules 28 or second membrane modules 110 are placed in a ring around the centre of the tank 220 in a horizontally spaced apart relationship. An internal divider 222 in the tank 220 is used to create a circular flow path 276 between the inlet 18 and the retentate outlet 42.

Figure 10:
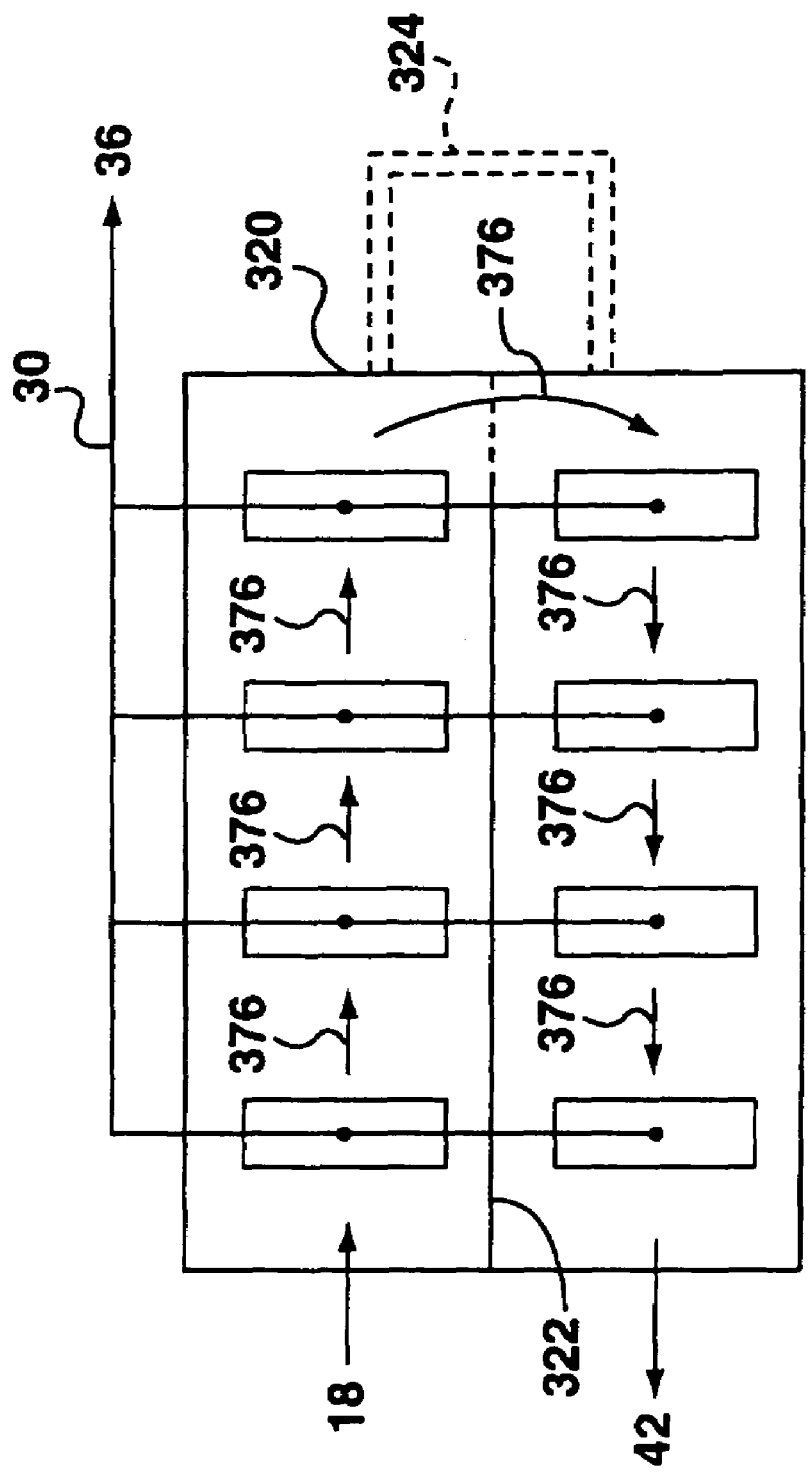

Referring to FIG. 10, a low aspect ratio or square tank 320 is used. Inlet 18 is located at one point on the tank 320 and the retentate outlet 42 is located at another point on the tank 320. An internal divider 322 in the tank 320 is used to create a flow path 376 between the inlet 18 and the retentate outlet 42. Membrane modules 28 or second membrane modules 110 are placed in series along the flow path 376 in a horizontally spaced apart relationship. Alternately, in a variation shown in dashed lines, the internal divider 322 is a wall between separate tanks joined in series by fluid connector 324.

Where the round tank 220 or low aspect ratio or square tank 320 is used in place of the third tank 128, partitions 176 are provided between second membrane modules 110.

EXAMPLE 1

A submerged membrane reactor according to FIGS. 5A and 5B was modelled using experimental data from tests under a continuous process and assuming that the local flow around the membrane modules is symmetrical in the upstream and downstream directions—ie. the overall tank flow towards the outlet was discounted. The system comprises a tank 16.4 metres long, 3.28 metres wide with an average depth of water of about 2.5 metres. The tank of the reactor contains 12 membrane modules each being a cassette of 8 ZW500 membrane modules. Each cassette is approximately 1.82 metres high, 1.83 metres wide and 0.71 metres long along the flow path and placed in the tank so as to leave approximately 0.75 m between the edge of the cassettes and the long walls of the tank. The cassettes are spaced evenly between the inlet end and outlet end of the tank. Transmembrane pressure is maintained at a constant 50 kPa throughout the model and the permeability of the membranes at any time is determined by a chart based on experimental data relating sustainable permeabilities to the concentration of solids in the water surrounding the membranes. The flow rate of feedwater and consolidated retentate were adjusted as necessary for a recovery rate of 95%. The feed water is assumed to have an initial concentration of solids of 10 mg/l.

In a first series of modelling experiments, the membrane modules were assumed to be continuously aerated at a constant rate that would result in a total cassette flow of about 3800 litres per minute (for a velocity of 0.05 m/s) upwards through the centre of each cassette and a downward flow of 1900 litres per minute down each of the upstream and downstream edges of each membrane module. The model assumes that all of this cassette flow flows downwards between adjacent membrane modules. The model also assumes that the water between adjacent membrane modules mixes completely such that 50% of the water flowing downwardly along the edge of a cassette, or 950 litres per minute is entrained in the flow moving upward through each adjacent membrane module. The model further assumes that any by-pass flow around the membrane modules 28 along the sides of the tank is negligible.

Figure 11:
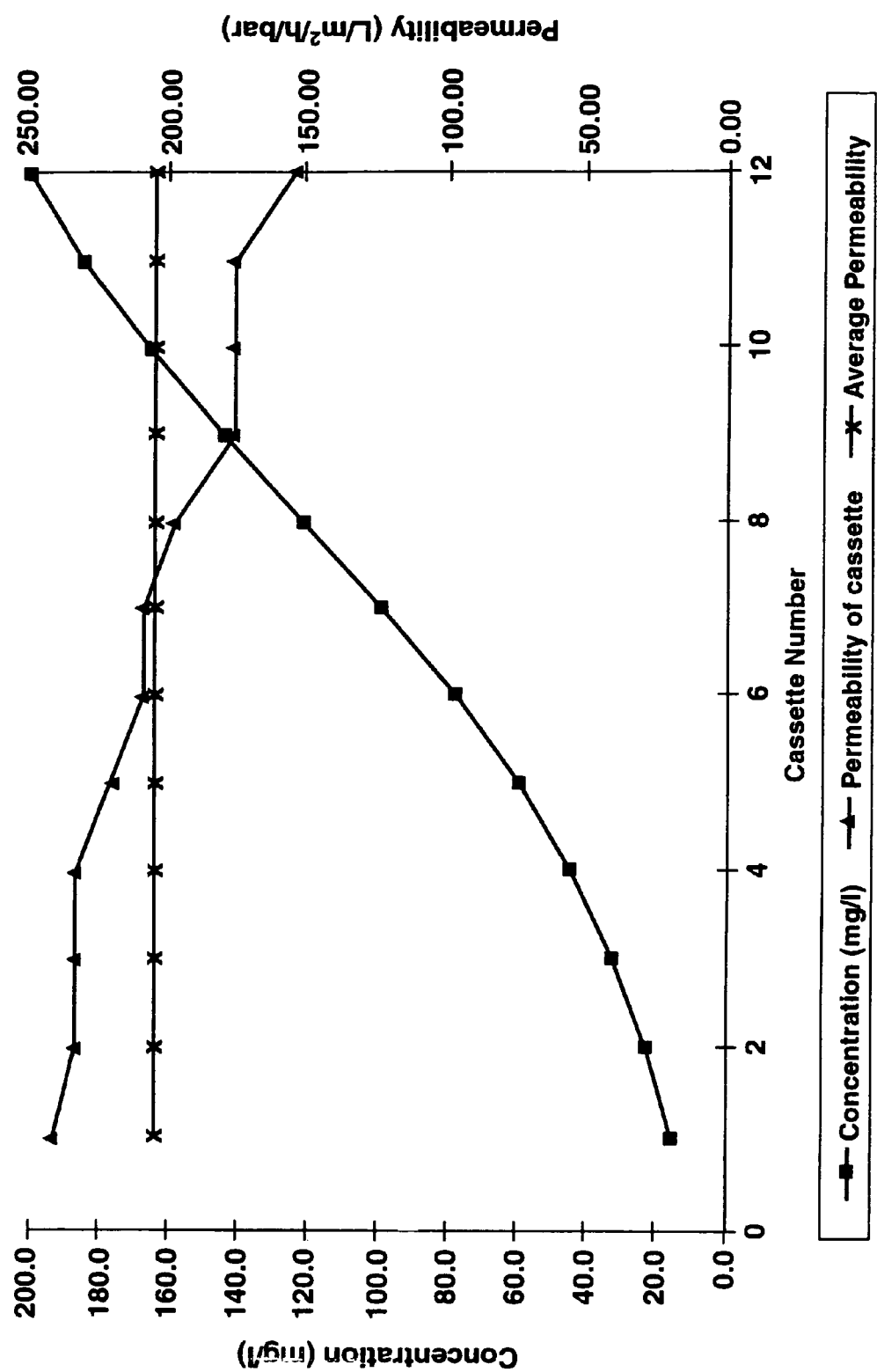
FIGS. 11 through 16 are charts showing the results of modelling experiments performed according to an embodiment similar to that of FIG. 5.

In a first test, the test reactor was modelled in continuous bleed operation, that is filtered permeate, consolidated retentate and feed water are all flow continuously. The concentration of solids at each cassette is shown in FIG. 11 and increases from approximately 20 mg/l to 200 mg/l. As shown, the average concentration of solids surrounding the cassettes is significantly reduced while the consolidated retentate has a concentration of solids of 200 mg/l. The expected permeability of the membrane modules is also shown in FIG. 11 which suggests that such a reactor will operate continuously with an average permeability of over 200 L/m²/h/bar with 8 of 12 membrane modules operating with permeabilities above that average. In comparison, in a conventional fully mixed process operating at the same 95% recovery rate, the concentration of solids throughout the tank would be 200 mg/l and all membrane modules would operate at a permeability of approximately 155 L/m$^2$/h/bar which would exceed the recommended operating conditions of the ZW500 membrane modules.

Figure 12:
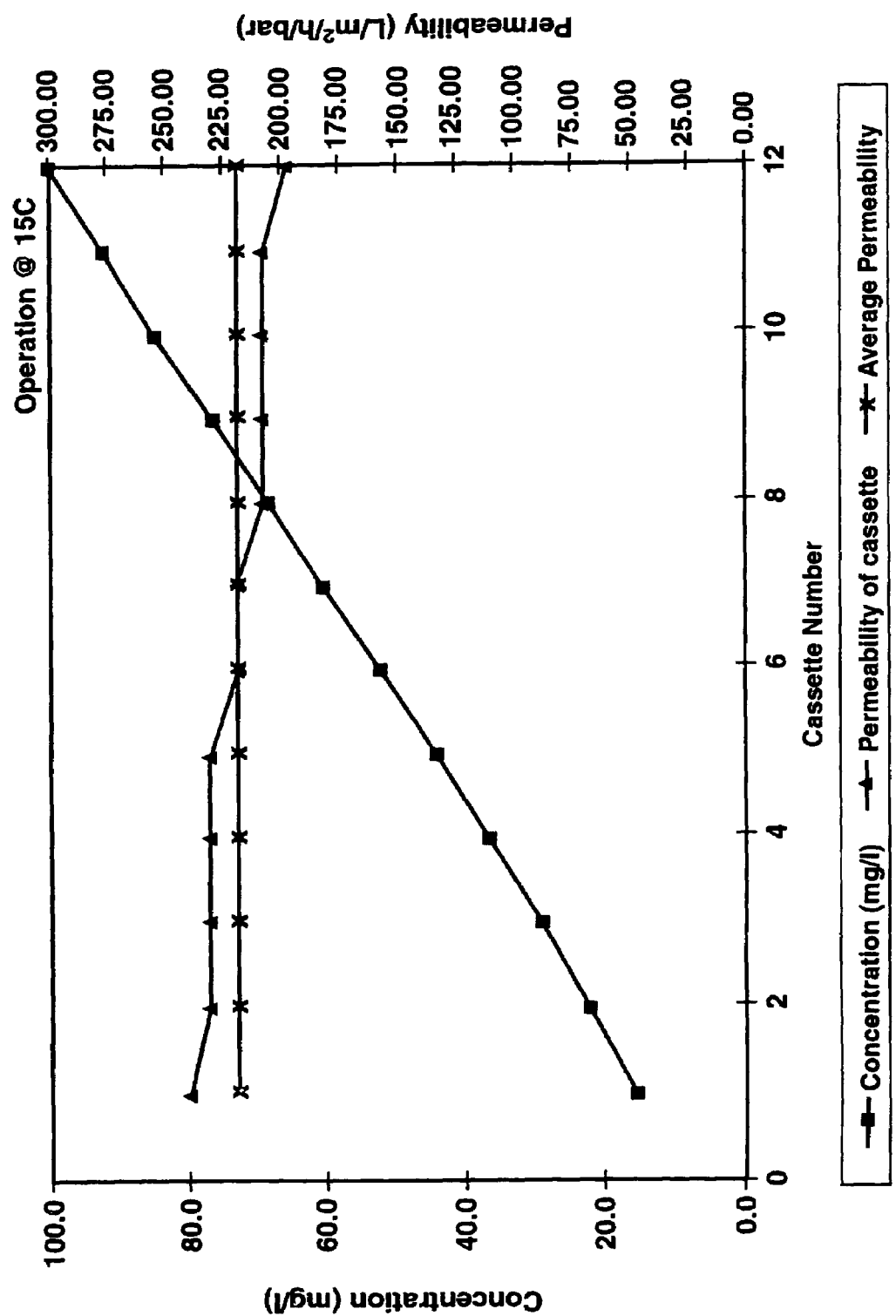

In a second modelling experiment, the first modelling experiment was modified to assume that the tank was emptied every four hours while permeation stops but with other parameters as above. The results of this experiment are shown in FIG. 12 which indicates that all cassettes can operate at a permeability above 200 L/m$^2$/h/bar with this process.

Figure 13:
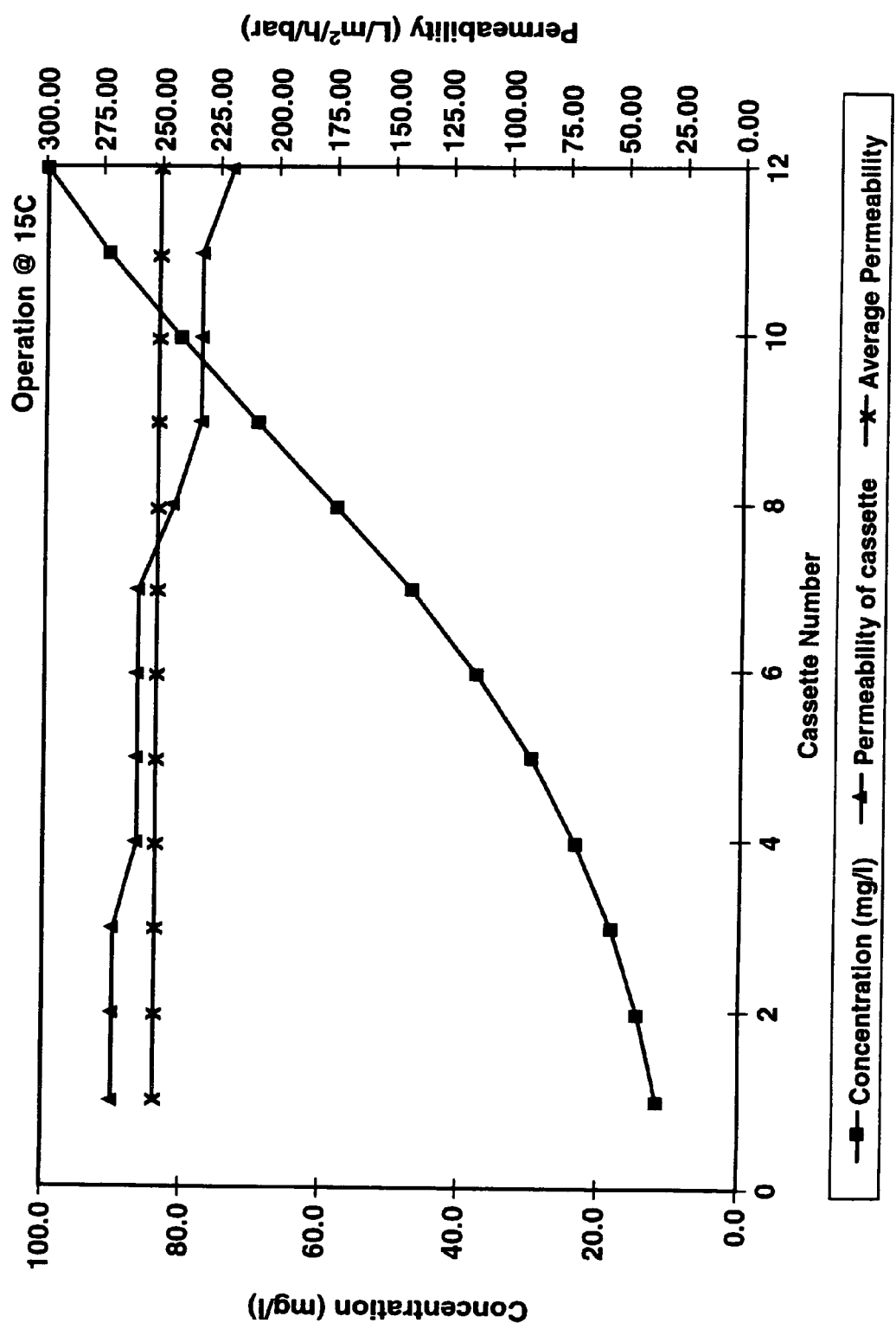

In a third modelling experiment, the first modelling experiment was modified to assume that the tank was deconcentrated every four hours by withdrawing consolidated retentate while increasing the flow rate of feedwater while permeation continues but maintaining a 95% recovery rate. The results of this experiment are shown in FIG. 13 which again indicates that all cassettes can operate at a permeability above 200 L/m$^2$/h/bar with this process.

Figure 14:
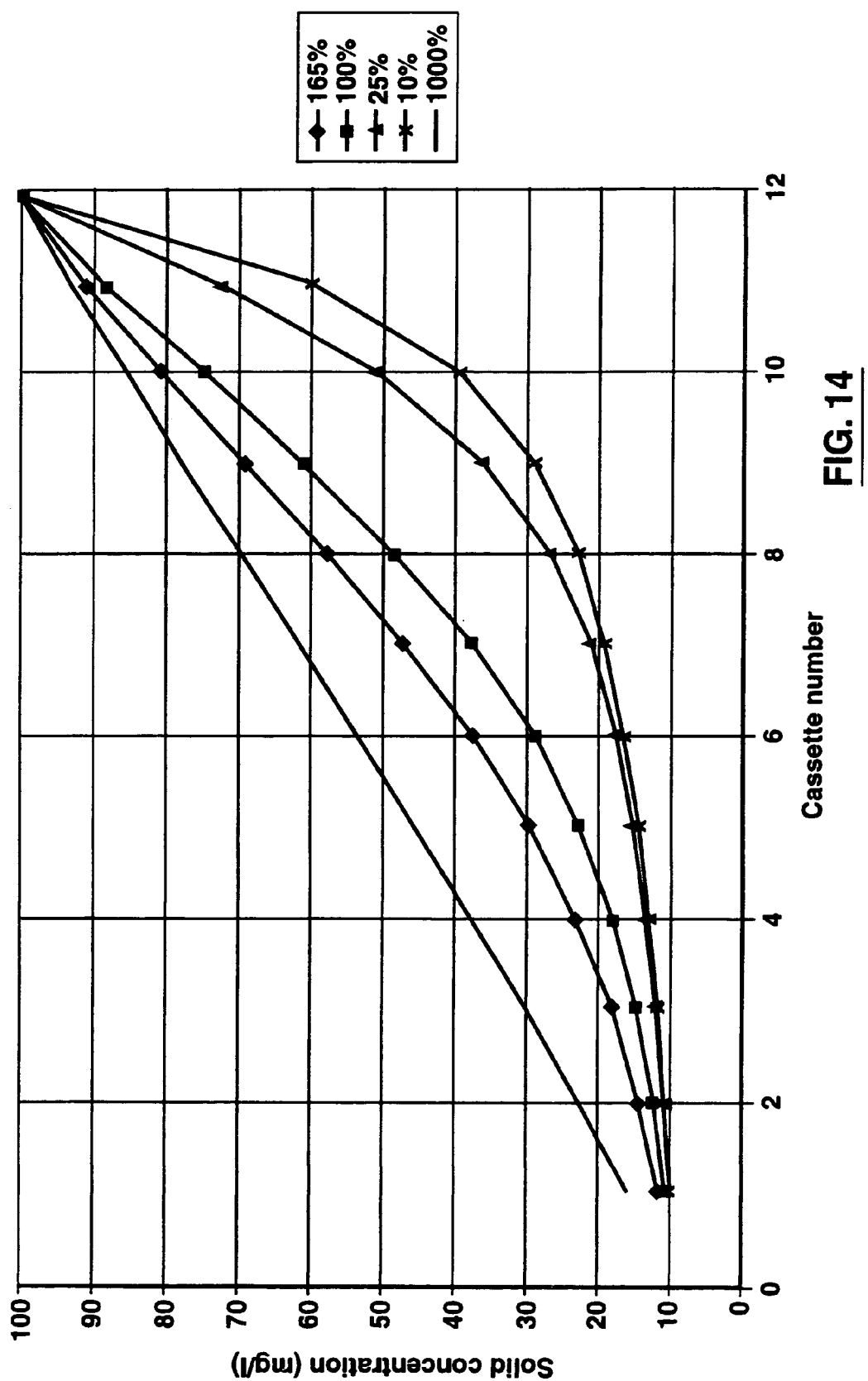

In a fourth modelling experiment, varying rates of aeration and thus varying recirculation rates were used. The results of this experiment are shown in FIG. 14 and indicate that recirculation rates of 25% produce drastically lowered concentrations of solids in the water surrounding a majority of cassettes and that even at a generous recirculation rate such as 100% or 165%, a majority of cassettes are exposed to water having a significantly reduced concentration of solids.

Figure 15:
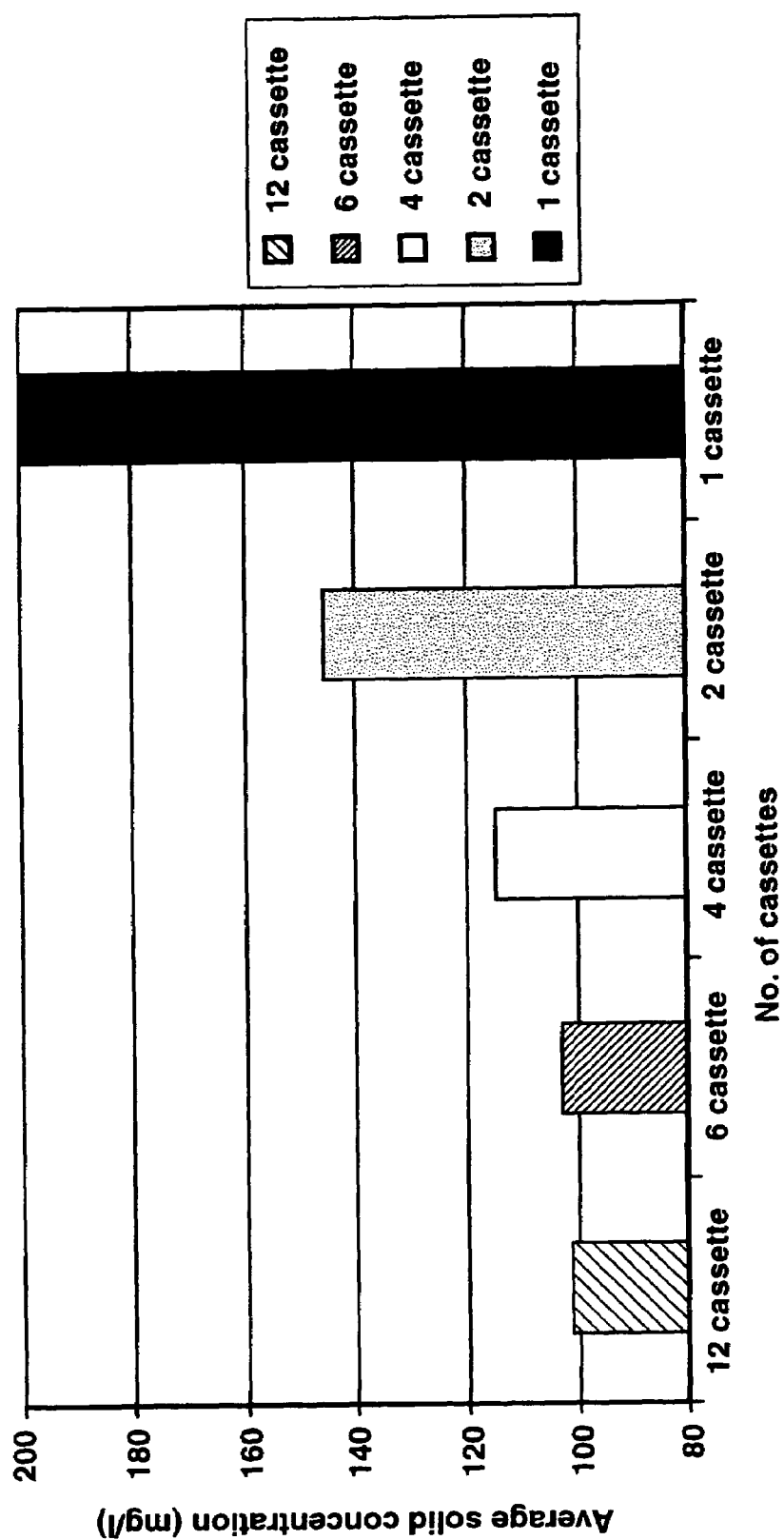

In a fifth modelling experiment, the model of the first modelling experiment was repeated without deconcentrations assuming a varying number of cassettes between 1 and 16. As shown in FIG. 15, the average concentration in the tank is reduced with even 2 or 4 cassettes and that with 6 or more cassettes, the average concentration of solids in the tank is nearly half of the concentration (200 mg/l) that would occur in the model with a conventional fully mixed process.

Figure 16:
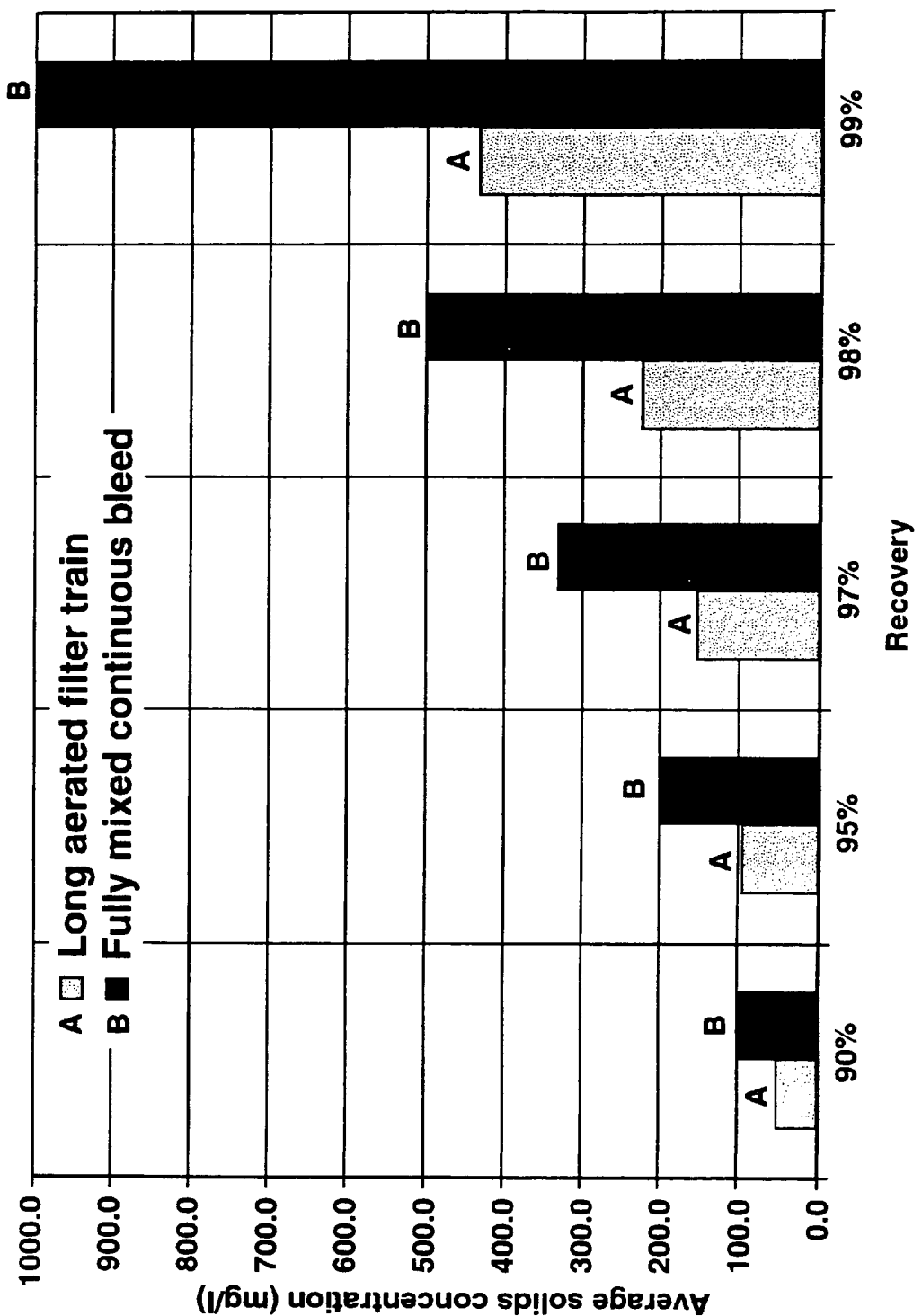

In a sixth modelling experiment, the model of the first modelling experiment was repeated without deconcentrations but with the recovery rate varying from 90% to 99% and compared to a model of a conventional fully mixed continuous bleed process operating at the same recovery rates. As shown in FIG. 16, a conventional process operating at a 95% recovery rate will have an average concentration of solids in the tank of 200 mg/l. The process and apparatus modelled for a long aerated filter train could be operated at a recovery rate of approximately 97.5% with the same average concentration of solids which would result in 50% less consolidated retentate to be disposed of.

EXAMPLE 2

Figure 17:
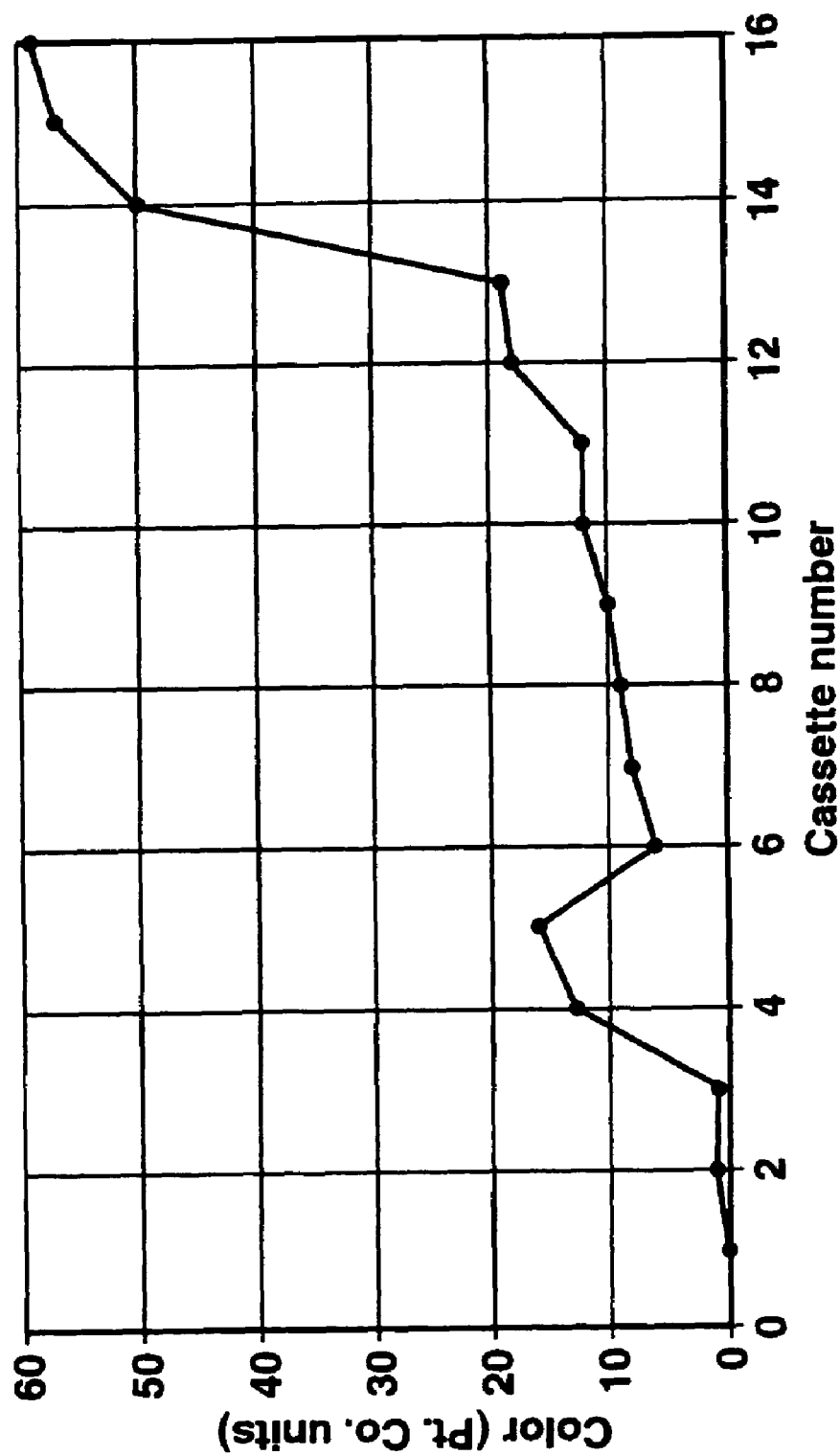
FIG. 17 is a chart showing the results of an experiment performed with an embodiment similar to that of FIG. 5.

In this example, an actual experimental apparatus was constructed and operated similar to FIGS. 5A and 5B. The dimensions of the tank were as described for the modelling experiments above, but 16 cassettes of 8 ZW500 membrane modules each were installed consecutively 20 cm apart from each other in the direction of the flow path and used with constant aeration. The apparatus was run continuously without deconcentrations at a recovery rate of 91%. The yield was maintained at a constant 93 litres/second with 9.4 litres/second of consolidated retentate continuously leaving the tank. Colour was monitored at each cassette along the tank as an indicator of the concentration of solids at each cassette. As shown in FIG. 17, the concentration of solids increased significantly only in the downstream 20% of the tank with most cassettes operating in relatively clean water.

EXAMPLE 3

An experiment was conducted with a water filtration system similar to FIGS. 5A and 5B comprising 12 cassettes of 8 ZW 500 modules each. The aeration was linearly increased from about 13.6 Nm$^3$/h for each ZW 500 for the first cassette to about 22.1 Nm$^3$/h for each ZW 500 for the last cassette. This resulted in a total reduction in system aeration from the usual 1989 Nm$^3$/h to 1785 Nm$^3$/h, more than a 10% reduction while the rate of membrane fouling remained the same and foaming was considerably reduced. In this experiment, the system recovery was 84% while the water temperature was at 22.5 degrees C.

It is to be understood that what has been described are preferred embodiments of the invention. The invention nonetheless is susceptible to certain changes and alternative embodiments without departing from the subject invention, the scope of which is defined in the following claims.

We claim:
1. A process for filtering water comprising,
    (a) introducing a feed water containing an initial concentration of solids into an open tank to immerse one or more filtering membranes located in the open tank, the feed water contacting a first side of the membranes; and
    (b) in repeated cycles,
        (i) applying suction on a second side of the membranes to withdraw a filtered permeate while adding sufficient feed water to keep the membranes submerged and permitting the concentration of solids in the water in the tank to rise to an increased concentration; and,
        (ii) partially deconcentrating the tank by (A) draining a volume of water equal to between about 75% to 20% of the volume of the water in the tank at the end of step (i) from the tank and (B) introducing a similar volume of feed water into the tank.
2. The process of claim 1 wherein the volume of water drained from the tank is between about 50% to 20% of the volume of water in the tank at the end of step (i).
3. The process of claim 1 wherein the volume of water drained from the tank is about 20% of the volume of water in the tank at the end of step (i).
4. The process of claim 3 wherein the tank is divided into zones and step (ii) is performed by draining and refilling a zone adjacent an outlet of the tank.
5. The process of claim 1 further comprising a step of backwashing the membranes between step (i) and step (ii).
6. The process of claim 1 wherein the steps of draining and introducing in step (ii) are performed generally simultaneously.
7. The process of claim 1 wherein the steps of introducing occurs after the step of draining in step (ii).
8. The process of claim 1 wherein the tank is rectangular and has a feed inlet and a drain at opposite ends of the tank.

* * * * *